US 7,010,061 B2
United States Patent
Subramanian

(10) Patent No.: US 7,010,061 B2
(45) Date of Patent: Mar. 7, 2006

(54) CONFIGURABLE ALL-DIGITAL COHERENT DEMODULATOR SYSTEM FOR SPREAD SPECTRUM APPLICATIONS

(75) Inventor: Ravi Subramanian, Mountain View, CA (US)

(73) Assignee: Infineon Technologies AG, Munich (DE)

(*) Notice: Subject to any disclaimer, the term of this patent is extended or adjusted under 35 U.S.C. 154(b) by 767 days.

(21) Appl. No.: 09/751,783

(22) Filed: Dec. 29, 2000

(65) Prior Publication Data

US 2001/0048724 A1    Dec. 6, 2001

Related U.S. Application Data

(60) Provisional application No. 60/173,633, filed on Dec. 30, 1999.

(51) Int. Cl.
*H04L 27/14* (2006.01)
*H04L 27/16* (2006.01)
*H04L 27/22* (2006.01)

(52) U.S. Cl. .................. 375/324; 375/371; 375/285
(58) Field of Classification Search ............. 375/142, 375/143–145, 148–150, 152, 343, 140, 130, 375/285, 324, 371; 370/335, 342, 320
See application file for complete search history.

(56) References Cited

U.S. PATENT DOCUMENTS

| 5,276,706 A | * | 1/1994 | Critchlow ................ 375/343 |
| 5,313,303 A | | 5/1994 | Ersoz et al. |
| 5,473,637 A | | 12/1995 | Gardner |
| 5,519,730 A | | 5/1996 | Jasper et al. |
| 5,712,869 A | | 1/1998 | Lee et al. |
| 5,802,102 A | * | 9/1998 | Davidovici ............... 375/152 |
| 5,815,529 A | * | 9/1998 | Wang ........................ 375/285 |
| 6,219,374 B1 | * | 4/2001 | Kim et al. ................ 375/130 |

OTHER PUBLICATIONS

Bernard Sklar, Digital Communications Fundamentals and Applications, published in 1988 by PTR Prentice Hall, pp. 83-89 and 139-141.*

* cited by examiner

Primary Examiner—Phuong Phu
(74) Attorney, Agent, or Firm—Darby & Darby

(57) ABSTRACT

A configurable all-digital coherent demodulator system for spread spectrum digital communications is disclosed herein. The demodulator system includes an extended and long code demodulator (ELCD) coupled to a traffic channel demodulator (TCD) and a parameter estimator (PE). The demodulator also includes a pilot assisted correction device (PACD) that is coupled to the PE and the TCD. The ELCD provides a code-demodulated signal to the TCD and the PE. In turn, the TCD provides a demodulated output data signal to the PE. The PACD corrects the phase error of the demodulated output data based on an error estimate that is fed forward from the PE. Accumulation operations in the ELCD, TCD, and PE are all programmable. Similarly, a phase delay in the PACD is also programmable to provide synchronization with the error estimate from the PE.

7 Claims, 15 Drawing Sheets

CONFIGURABLE ALL-DIGITAL COHERENT DEMODULATOR SYSTEM FOR SPREAD SPECTRUM APPLICATIONS

CROSS-REFERENCE TO RELATED APPLICATIONS

This application claims priority to the provisional patent application with the following Ser. No. 60/173,633, filed Dec. 30, 1999.

Related applications which are incorporated herein by reference, are:
A CONFIGURABLE MULTIMODE DESPREADER FOR SPREAD SPECTRUM APPLICATIONS
Ser. No. 09/751,785 filed Dec. 29, 2000
APPARATUS AND METHOD FOR CALCULATING AND IMPLEMENTING A FIBONACCI MASK FOR A CODE GENERATOR
Ser. No. 09/751,776 filed Dec. 29, 2000
A FAST INITIAL ACQUISITION & SEARCH DEVICE FOR A SPREAD SPECTRUM COMMUNICATION SYSTEM
Ser. No. 09/751,777 filed Dec. 29, 2000
A CONFIGURABLE CODE GENERATOR SYSTEM FOR SPREAD SPECTRUM APPLICATIONS
Ser. No. 09/751,782 filed Dec. 29, 2000
METHOD AND APPARATUS TO SUPPORT MULTI STANDARD, MULTI SERVICE BASE-STATIONS FOR WIRELESS VOICE AND DATA NETWORKS
Ser. No. 09/752,050 filed Dec. 29, 2000
IMPROVED APPARATUS AND METHODS FOR MULTI-THREADED SIGNAL PROCESSING
Ser. No. 09/492,634, filed on Jan. 27, 2000

Except for application Ser. No. 09/492/634, all the above applications are filed simultaneously herewith.

TECHNICAL FIELD

The present claimed invention relates to the field of wireless communication. In particular, the present claimed invention relates to an apparatus and a method for demodulating digital spread-spectrum signals in a wireless communication system.

BACKGROUND ART

Wireless communication has extensive applications in consumer and business markets. Among the many communication applications/systems are: fixed wireless, unlicensed Federal Communications Commission (FCC) wireless, local area network (LAN), cordless telephony, personal base station, telemetry, mobile wireless, and other digital spread spectrum communication applications. While each of these applications utilizes spread spectrum communications, they generally utilize unique and incompatible modulation and protocols. Consequently, each application may require unique hardware, software, and methodologies for demodulation. This practice can be costly in terms of design, testing, manufacturing, and infrastructure resources. As a result, a need arises to overcome the limitations associated with the varied hardware, software, and methodology of demodulating digital signals in each of the varied spread spectrum applications.

A demodulator component is used in a wireless communication device for code demodulation and data demodulation of a received signal in order to provide the data signal. However, the received data signal may have impairments due to transmission and propagation delay factors. This impairment can be characterized as multipath fading in which each path exhibits a random, complex, and time-varying phase delay of the signal. Consequently, a need arises for a receiver to correct the phase error in a received signal.

Pilot signals are used in transmission protocols to help the receiver estimate an unknown channel. Essentially, a pilot signal supports estimation of an unknown random variable with known data. Coherent demodulation solves part of the phase error problem by utilizing a pilot signal having known data, e.g., a pseudonoise (PN) data sequence. The PN data sequence is known to both the transmitter and the receiver. If the transmitter sends out a known pilot signal with a known PN sequence, then the receiver can determine the phase correction using an internally generated PN sequence that is identical to that of the transmitter. To correct the phase error, a feedback loop can be provided to a radio frequency/intermediate frequency (RF/IF) transceiver to make phase adjustments. However, this requires the feedback signal to be in an analog format. Furthermore, the RF/IF transceiver is an analog device utilizing analog components, such as a voltage-controlled oscillators (VCOs) to generate a frequency. These analog components have well-known weaknesses such as temperature sensitivity, drift, etc. Thus, a need arises for a method and apparatus to overcome the limitations in conventional analog phase correction system.

Because of the nature of a feedback system, a lag in the correction of a signal occurs. That is, the received signal that has passed through demodulation prior to the correction does not receive the benefit of the corrected phase in the RF/IF transceiver. Thus, errors can be propagated through a communication device due to the intermittent phase error and the lag in the feedback correction system. This error propagation can impair the quality of service achieved using a communication device. Poor quality of service can have detrimental effects, particularly when users demand increasingly stringent performance standards. Furthermore, a feedback system to an analog device can be complicated and costly. The nature of a feedback system is a closed-loop phase tracking process. Unfortunately, a closed feedback system of this nature is not robust, especially in fading channels. As a result, a need arises for a phase correction system that overcomes some of the major limitations of a conventional feedback system.

SUMMARY OF THE INVENTION

The present invention provides a method and apparatus that overcomes the limitations associated with the varied hardware, software, and methodology of demodulating digital signals in each of the varied spread spectrum applications. Furthermore, the present invention provides a receiver to correct the phase error in a received signal. Additionally, the present invention overcomes the limitations in conventional analog phase correction system. In particular, the present invention overcomes some of the major limitations of a conventional feedback system.

A first embodiment of the present invention provides a configurable demodulator system. The demodulator system includes a configurable extended and long code demodulator (ELCD) coupled to a configurable traffic channel demodulator (TCD) and a configurable parameter estimator (PE). The demodulator also includes a configurable pilot assisted correction device (PACD) that is coupled to the PE and the TCD. The ELCD provides a code-demodulated signal to the TCD and the PE. In turn, the TCD provides a demodulated output data signal to the PE. The PACD corrects the phase error of the demodulated output data based on an error estimate that is fed forward from the PE. Accumulation operations in the ELCD, TCD, and PE are all programmable, or configurable. Similarly, a phase delay in the PACD is also programmable to provide synchronization with the error estimate from the PE.

A second embodiment of the present invention provides a method of processing spread spectrum data using a receiver. The method comprises several steps, the first of which is receiving an analog signal at an RF/IF stage. Next, the analog signal is converted to a digital signal using an analog-to-digital (A/D) converter. The digital signal is then filtered using a chip-matched filter to obtain a complex channel signal. In the next step, the complex channel signal is processed using a demodulator system having a feed forward phase correction signal. In particular the last step includes several sub steps, the first of which demodulates a user code sequence from the complex channel signal to produce a code-demodulated sample. The code-demodulated sample is communicated to multiple traffic demodulators, each of which demodulates a different traffic code sequence. In the next step, the demodulated output data sample is communicated to a parameter estimator/pilot assisted correction device pair for each of the plurality of multipath channels. A phase correction signal is fed forward from each of the parameter estimators to its respective pilot assisted correction device. The phase error of the demodulated output data is corrected at each of the pilot assisted correction devices based on the feed forward phase correction signal from the parameter estimator.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques. These systems or techniques include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multipoint distribution system (MMDS). Examples include wireless cable broadcast, or two-way wireless local loop (WLL)

systems. Some examples of a W-LAN, that can communicates digitized audio and data packets, for which the present invention can be applied include Open Air, and the Institute of Electrical and Electronics Engineers (IEEE) specification 802.11b. And in the application of unlicensed FCC applications, the present invention may be applied to specific instances such as the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols. The range of modulation techniques that are utilized in the exemplary spread spectrum applications disclosed herein are useful to define the class of functions for which the present configurable all-digital coherent demodulator is applicable.

Figure 1A:
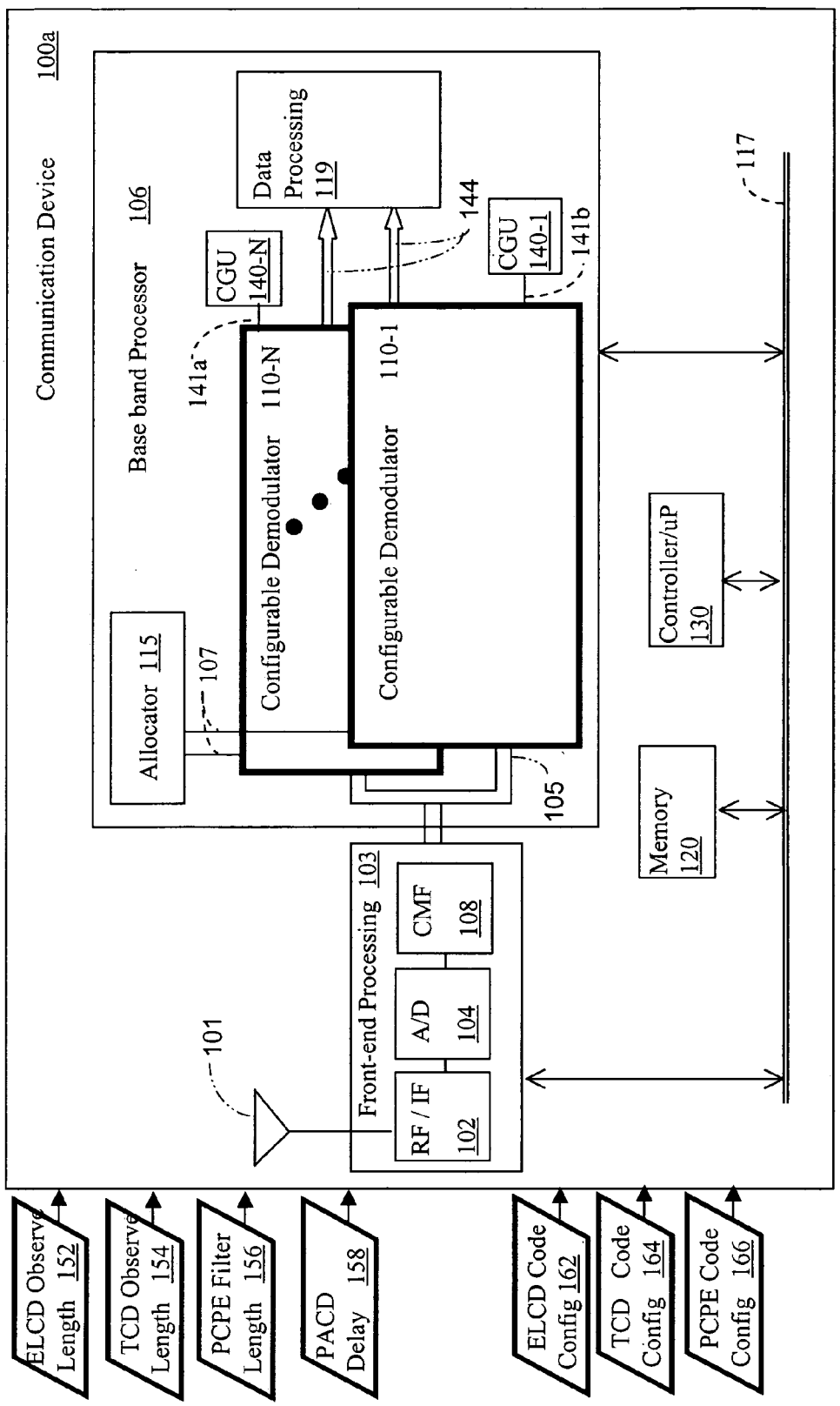
FIG. 1A is a block diagram of a spread spectrum electronic communication device having a feed forward all-digital demodulator system, in accordance with one embodiment of the present invention.

The detailed description of the present invention begins with a description of a communication device, in FIG. 1A in which a configurable all-digital coherent demodulator is implemented. Then, the detailed description section continues with details of the physical structure and architecture of the components of the configurable all-digital coherent demodulator, in FIGS. 1B–1D and FIGS. 2 through 6. Lastly, the detailed description section describes, in FIGS. 7A–7F, various processes associated with the configurable all-digital coherent demodulator, using exemplary flowcharts.

Communication Device

Referring now to FIG. 1A, a block diagram of an electronic communication device having a feed forward all-digital demodulator system is shown, in accordance with one embodiment of the present invention. Electronic communication device 100a provides an exemplary application of the present invention in a wireless code division multiple access (CDMA) base station. However, the present invention is well suited to use in a mobile handset, a test platform, embedded wireless modem, or other communication device. Furthermore, the present invention is applicable to any electronic device needing to demodulate a data signal. The feed-forward phase correction all-digital demodulator portion of the communication system 100a is described in more detail in subsequent hardware diagrams and flowchart diagrams.

Communication device 100a includes an antenna 101, a front-end processing block 103, a base band processing block 106, a microprocessor ($\mu$P)/controller 130, a memory block 120, and a bus 117. Front-end processing block 103 is coupled to base band processing block, both of which are coupled to $\mu$P 130 and memory block 120 via bus 117. Microprocessor 130 and memory block 120 support the exchange of data and/or instructions to the various components of communication device 100a.

Front-end processing block 103 is coupled to antenna 101 to receive a wireless signal. Front-end processing block includes a radio frequency/intermediate frequency (RF/IF) transceiver 102, an analog to digital (A/D) converter 104, and a chip-matched filter (CMF) 108, coupled to each other in series. RF/IF transceiver 102 includes components such as a voltage-controlled oscillator (VCO), known to one skilled in the art. A/D converter 104 digitizes the analog signal from the RF/IF transceiver 102 into a digital signal in a reception path. The output of CMF 108 can be a complex signal, which is represented by interconnect 105. Data transmitted within communication device 100a can be real only or can be complex, depending upon the application. The transfer of real and complex signals can be accomplished by use of parallel lines for parallel transfer of data or by use of memory buffers and a single line for serial transfer of data. Front-end processing block 103 is an exemplary embodiment. The present invention is well suited to a wide variety of front-end processing components and architectures.

Base band processing block 106 processes the recovered digital signal provided by the front-end processing block 103. Base band processing block 106 includes at least one pilot assisted demodulator block 110-1 through 110-N, CGU 140-1 through 140-N, an allocator 115, and optional data processing block 119. A demodulator block 110-1 through 110-N refers to a virtual or physical grouping of components per a category, e.g., for application to a given multipath. In the present embodiment, configurable demodulator block 110-1 is repeated in parallel "N" times (where "N" is an arbitrary number) (110-1 through 110-N) in order to realize multipath receiver support D-channel diversity combining. The D-channel of the N paths is used to realize a multipath-combining receiver in the present embodiment. This enables the creation of a rake receiver for wideband code division multiple access (WCDMA) handsets and base stations in one embodiment. However, only one configurable demodulator 110-1 is utilized in another embodiment.

Each demodulator plane 110-1 through 110-N, has its own code generator unit (CGU), e.g., 140-1 through 140-N respectively, in the present embodiment. Configurable demodulator block 110-1 and 110-N are coupled to the following components: front-end processing block 103 via line 105; allocator 115 via line 107; data processing block 119 via lines 144; and are coupled to CGU 140-1 and CGU 140-N via lines 141a and 141b, respectively. CGUs 140-1 through 140-N provide codes appropriate for demodulating operations in each of the respective demodulator planes. In another embodiment, a single CGU, e.g., 140-1, provides codes to multiple demodulator planes, e.g., by time-sharing the CGU resources. Data processing block 119 performs functions such as combining, decoding, etc., that are performed by a combiner, a codec device, and other components known by those skilled in the art. These components are not shown in data processing block 119 for purposes of clarity.

Demodulators 110-1 through 110-N are configurable in terms of what modulation and spreading codes they can demodulate, and in terms of the rate, or length, over which the modulation occurs at a transmitter. Thus, communication device 100a receives the following exemplary configuration inputs; extended and long code demodulator (ELCD) observation length 152, traffic code demodulator (TCD) observation length 154, pilot channel parameter estimator (PCPE) filter length 156, pilot assisted correction device (PACD) delay 158, ELCD code configuration 162, TCD code configuration 164, and PCPE code configuration 166. This configuration information can be received via wired communications with a computing device, e.g., a workstation, in the present embodiment, or can also be provided by an electronic storage medium, e.g., CD-ROM, or by wireless transmission, via antenna 101. Configuration information is provided at the time communication device 100a is manufactured and/or initially programmed for operation in the field, in the present embodiment. However, the configuration information can also be dynamically implemented during communication device 100a operation in the field. Configuration information is received, processed, and implemented via controller 130 and memory 120 which communicate this information and instruction via bus 117 to base band processor 106. Within base band processor allocator 115 controls implementation of configuration information to, and operation of, configurable demodulator blocks 110-1 through 110-N in the present embodiment. Additional information on the design and implementation of configurations into a configurable communication device is provided in the above-referenced co-pending U.S. patent application Ser. No. 09/492,634, entitled "IMPROVED APPARATUS AND METHOD FOR MULTI-THREADED SIGNAL PROCESSING."

Furthermore, because the communication device is configurable to implement a wide range of demodulator codes in the all-digital demodulator, it necessarily follows that a code generator must be able to provide this wide range of demodulation codes. In one embodiment, a configurable code generator unit (CGU) can provide any one of a wide variety of codes and types of codes according to the code configuration requests received. The wide variety of codes producible by configurable CGU, can include, but is not limited to: multiple types of channelization codes, multiply types of traffic codes, multiple types of user codes, and/or multiple types of extended codes. Some examples of code sequences to which the present invention can be applied include, but are not limited to: M-sequences, Gold codes, S2 codes, etc. One embodiment of such a configurable code generator is provided in the above-referenced co-pending U.S. patent application Ser. No. 09/751,782, now U.S. Pat. No. 6,567,017, entitled "A CONFIGURABLE CODE GENERATOR SYSTEM FOR SPREAD SPECTRUM APPLICATIONS". This related application is commonly assigned, and is hereby incorporated by reference.

Figure 1B:
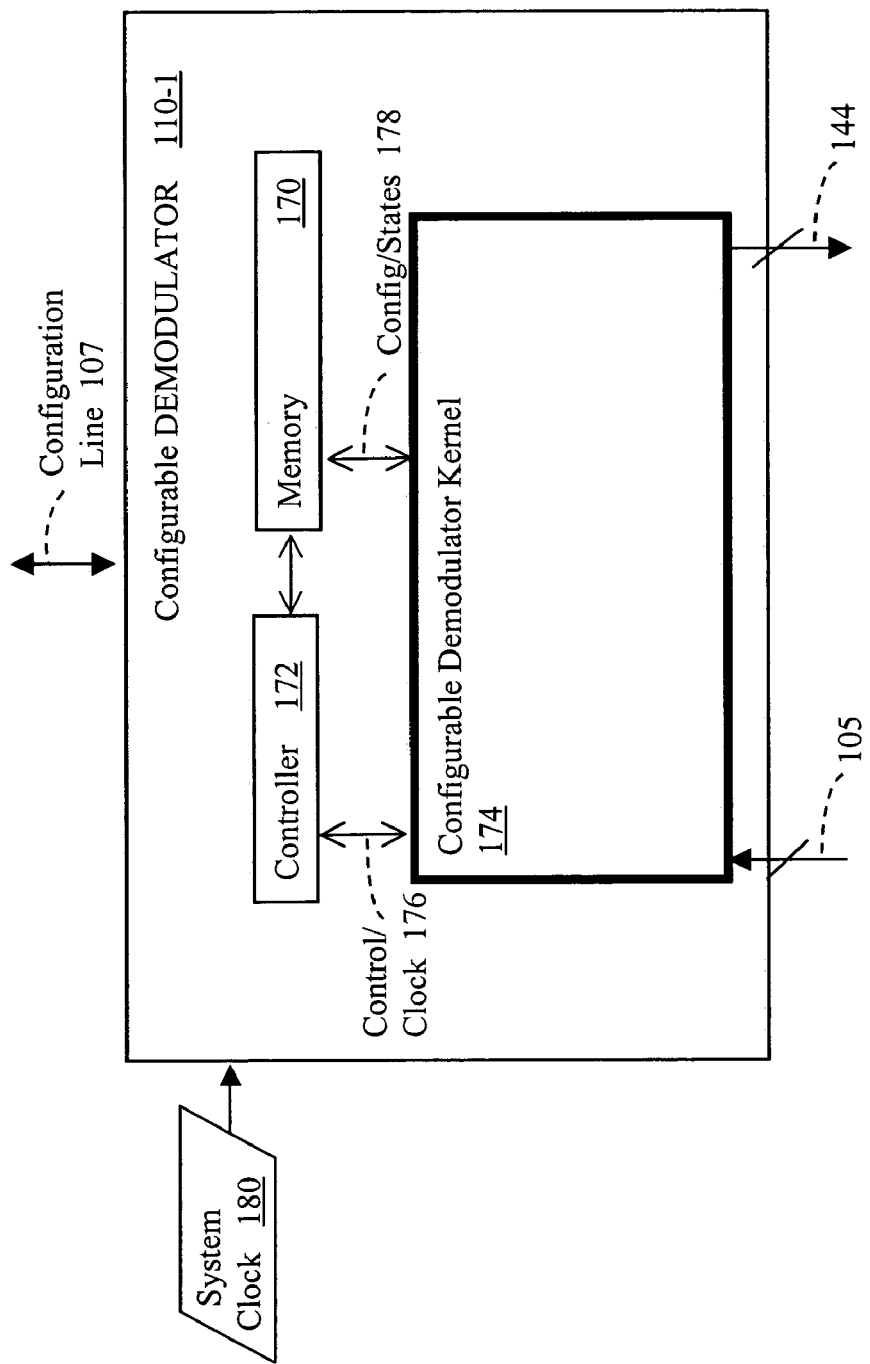
FIG. 1B is a block diagram of a demodulator block in which the configurable demodulator kernel is operated, in accordance with one embodiment of the present invention.

Referring now to FIG. 1B, a block diagram of a demodulator block in which the configurable demodulator kernel is operated is shown, in accordance with one embodiment of the present invention. Configurable, or multimode, demodulator block 110-1 includes a local controller 172, a configurable demodulator kernel 174, and a memory block 170, in the present embodiment. Configurable, or multimode, demodulator kernel 174 is a satellite kernel, which is algorithmic-specific in the present embodiment. That is, while demodulator kernel 174 is a configurable electronic device capable of performing a wide range of algorithms, the algorithms are nonetheless limited to the class of demodulating functions. An exemplary description of a multimode demodulator kernel 174, e.g., components and coupling arrangements, is provided in subsequent FIGS. 1C and 1D.

Input data line(s) 105 and output data line(s) 144 are coupled to configurable demodulator kernel 174 to provide data transfer, in the present embodiment. Input data line(s) 105 and output data line(s) 144 are implemented as separate lines as shown in FIG. 1B, but can also be implemented as a bus in another embodiment. In particular, input data line(s) 105 and output data line(s) 144 provide data streams to and from multimode demodulator kernel 174 with respect to other kernels or components in the communication device 100a. Local controller 172 provides control and locally scaled clock signals, in one embodiment, to configurable demodulator kernel 174, via line 176, to enable data transfer with minimal input from a global controller, e.g., controller 130 of FIG. 1A. The communication mechanism between each kernel is dataflow driven in the present embodiment, but can be control flow, or some other type of flow in another embodiment.

Controller 172 is a state machine with memory, in the present embodiment, capable of controlling multimode demodulator kernel 174. In another embodiment, controller 172 includes memory that is capable of preserving state conditions of at least one configuration of multimode demodulator kernel 174. Configurable demodulator kernel 174 uses a distributed control and configuration via local controller 172, which effectively reduces overhead in terms of instruction fetch and global control. Configurable demodulator kernel 174 receives system clock input 180. Controller 172 and/or memory 170 receive configuration information from configuration line 107, e.g., from allocator 115 of FIG. 1A, in the present embodiment. However controller 172 and/or memory 170 receive this information directly from controller 130 and memory 120 in another embodiment. In one embodiment, local controller 172 scales system clock input 180 to a desired local clock rate for multimode demodulator kernel 174. Local clock scaling allows operation of multimode demodulator kernel 174 at higher rates than the system clock. This allows for time-sliced methodology, whereby virtual instances of a single hardware configurable demodulator kernel 174 can be implemented to serve multiple users or channels. States and configurations of configurable demodulator kernel 174 are swapped to/from memory 170 for each of the time-slice instances, via configuration/states line 178. Control/clock line 176 provides scaled clock signals, and provides control signals to, and receives status signals from, multimode demodulator kernel 174, in the present embodiment.

Memory block 170 is any type of memory, e.g., random access memory (RAM), a register file, or combination thereof. Memory block 170 stores data, instructions, states, and/or configuration information for controller 172 and/or multimode demodulator kernel 174, in the present embodiment. Memory block 170 is coupled to receive configuration information, e.g., PCPE code configuration 166, and demodulator observation length 154 as shown in FIG. 1A, via configuration line 178. Memory block 170 includes static registers, which are fixed at initialization, in the present embodiment. However, the present invention is well suited to utilizing dynamic registers in memory block 170 that can be updated internally and on the fly by other components within a communication device, e.g., by local controller 172. Memory 170 passes configuration and state information to multimode demodulator kernel 174 via interconnect 178.

By having local memory block 170 and local controller 172, configurable demodulator kernel 174 is an autonomous device in the present embodiment. This arrangement provides a very quick and efficient changing of configuration data for algorithmic satellite kernel, or multimode demodulator kernel, 174. Therefore, time-sharing of a hardware kernel is feasible and practical.

Configurable demodulator kernel 174 of FIG. 1B is well suited to alternative embodiments. For example, system controller can provide control functions to multimode demodulator kernel 174, thus eliminating local controller 172. In another alternative, memory block 170 can be any form of memory, such as registers, flash memory, etc.

Figure 1C:
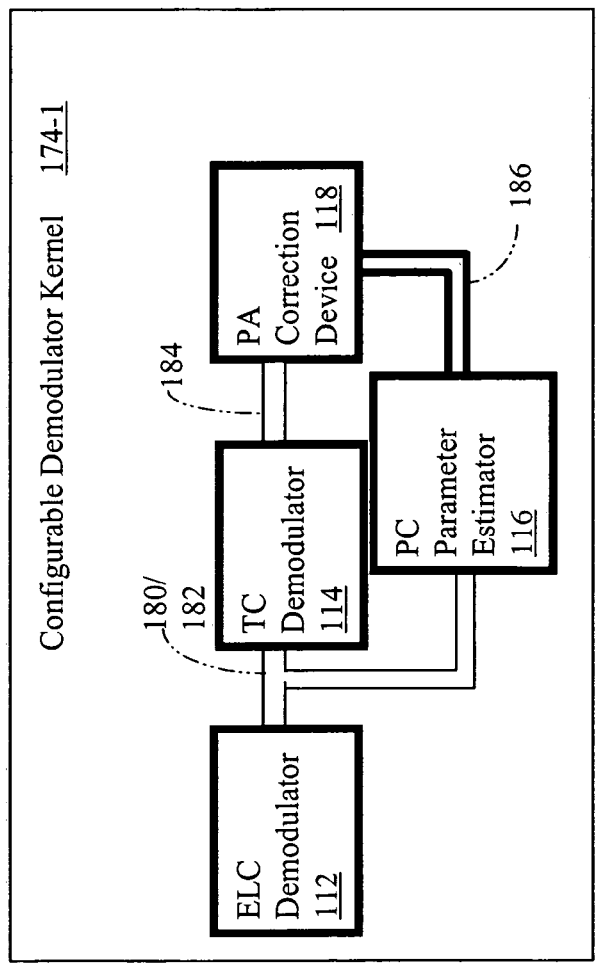
FIG. 1C is a block diagram of the configurable demodulator kernel, in accordance with one embodiment of the present invention.

Referring now to FIG. 1C, a block diagram of the configurable demodulator kernel is shown, in accordance with one embodiment of the present invention. FIG. 1C provides one configuration of the demodulator blocks included within an exemplary demodulator kernel 174-1 applicable in configurable demodulator 110-1 of FIG. 1B and in exemplary communication device 100a of FIG. 1A.

Configurable demodulator block 174-1 is an exemplary configuration that can be applied to each of the multiple configurable demodulator blocks 110-1 through 110-N.

Included within configurable demodulator kernel 174-1 are a configurable extended and long code demodulator (ELCD) 112, a configurable traffic channel demodulator (TCD) 114, a configurable pilot channel parameter estimator (PCPE) 116, and a configurable pilot assisted correction device (PACD) 118. TCD 114 and PCPE 116 are coupled in parallel to both PACD 118, via lines 184 and 186 respectively, and are coupled to ELCD 112 by common lines 180/182. These demodulator components 112–118 coherently demodulate the digital data in both code and data. In particular, the coherent demodulation includes extended and long code demodulation, as well as coherent traffic channel demodulation via pilot-channel assist. Additional description of the operation of configurable demodulator block 174-1 is provided in subsequent flowcharts 7000–8500.

Notably, PCPE 116 is coupled to PACD 118 via feed forward line 186 to provide a digital feed forward phase correction signal for the demodulated output data sample. In this manner, the present invention provides a phase correction signal that is specific to a given signal, e.g., multipath, on a configurable demodulator plane 110-1. Thus, the present invention overcomes the limitation of providing a composite signal based on the phase offset averaged from multiple demodulation circuits, some of which may be contradictory. Additionally, the present invention corrects the phase of a data signal in real time, provided the phase correction signal and the data signal for which it was calculated are synchronized. Thus, the present invention overcomes the limitation of a conventional feedback phase correction system wherein data signals are corrected for a past phase error, e.g., due to feedback timing. As a result, the fidelity of the data signal is much greater than that of a conventional feedback system.

The specific configuration of ELCD 112, TCD 114, PCPE 116, and PACD 118 of base band processing block 106 is chosen to instantiate a specific embodiment of a signal transmission technique. The specific signal transmission technique utilized for the present invention uses a spread spectrum transmission technique having a code-multiplexed pilot signal. The transmitter includes a traffic channel, $W_d$, that is built, for example, on the short Walsh code, and a code-multiplexed pilot channel $W_p$ that is also built, for example, on the short Walsh code. Typically, based on the transmission environment, the energy devoted to the pilot channel can vary. The two channels (in-phase and quadrature-phase) are then code multiplexed to create the baseline complex physical channel. This baseline channel is then pseudonoise (PN) modulated with a user's unique long PN code (a real number), denoted as $C_{PNLong}$, followed by PN modulation by a complex extended PN sequence, denoted as $C_p+jC_q$. The resulting complex channel is fed into a transmit chip pulse shaping filter, followed by an IQ carrier modulator. While the present embodiment is applicable to this specific transmission technique, the present invention is well suited to accommodating a wide range of signal transmission techniques. Some of these alternative signal transmission techniques may dictate more or less components, or may dictate alterative coupling arrangements, than the present embodiment. However, the concept of the present invention is still applicable to these alternative embodiments.

Those skilled in the art will recognize numerous advantages associated with the disclosed technology. These advantages include: (1) separation of traffic and pilot channel demodulators using pure feed-forward techniques; (2) realization of an multiple phase shift key (MPSK) pilot channel using a non-interpolative parameter estimator; (3) a demodulator architecture that can be programmed for different user, group, and long code configurations for WCDMA; (4) a demodulator architecture that can be parameterized according to system and channel conditions to achieve near-ideal performance via quasi-coherent reception; (5) a demodulator architecture that can employ a pilot-assisted method for coherent detection for systems with code-multiplexed pilot channels; (6) a low-complexity implementation of a coherent demodulator for WCDMA; and (7) a demodulator architecture that can be configured to operate in any standard using CDMA with MPSK modulation and a code-multiplexed pilot. Furthermore, the new architecture represents a single datapath that can be configured to multiple standards that employ the principle of code-multiplexed pilot signals, thereby reducing circuitry. This new architecture offers a very low-complexity approach to design of quasi-coherent demodulators. The feed forward nature of the architecture allows for robust performance in fast-changing mobile radio environments.

Figure 1D:
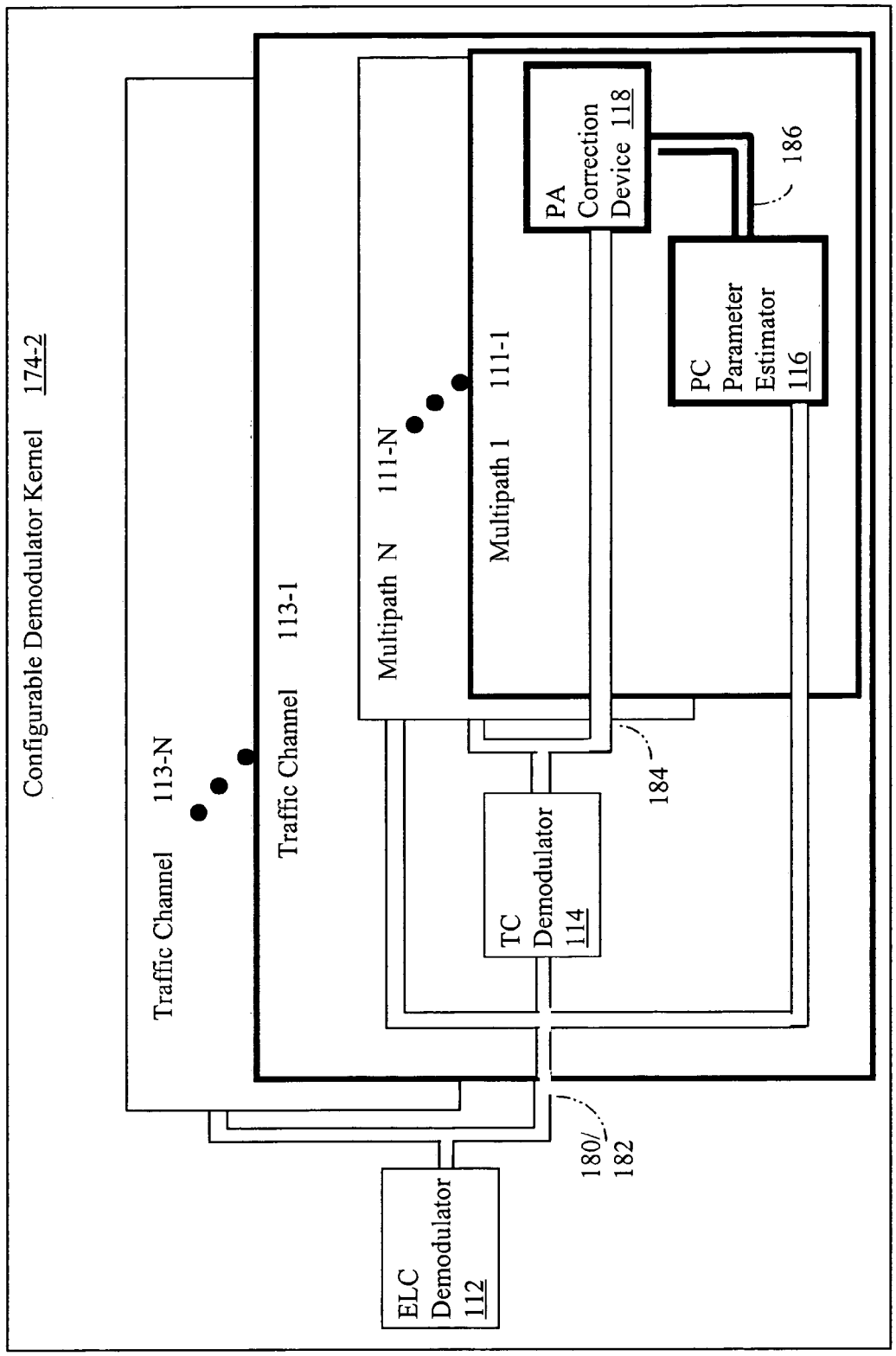
FIG. 1D is a block diagram of an alternative hierarchical arrangement of components within the configurable demodulator kernel, in accordance with one embodiment of the present invention.

Referring now to FIG. 1D, a block diagram of an alternative hierarchical arrangement of components within the configurable demodulator kernel is shown, in accordance with one embodiment of the present invention. Configurable demodulator kernel 174-2 has many components and coupling arrangements that are similar to those resented in configurable demodulator kernel 174-1 of FIG. 1C. For purposes of clarity, only a description of components, coupling arrangements, and alternative embodiments for FIG. 1D that are different from FIG. 1C will be provided herein. Otherwise, the description of components, coupling arrangements and alternatives provided in FIG. 1C apply similarly to FIG. 1D.

Notably, configurable demodulator kernel 174-2 utilizes a single ELCD 112 in base band block to provide signals to the multiple traffic channel planes 113-1 through 113-M, and the subsequent multiple demodulator planes 111-1 through 111-N, used for multipath signals This configuration is chosen for the present embodiment to eliminate hardware repetition, thus saving power and integrated circuit area. In particular, the extended and long code will be the same for a given user in a communication device. Thus, only a single ELCD 112 can be used to supply all the traffic channel planes 113-1 through 113-M configurable demodulator kernel 174-2. However, if multiple users exist in communication device 100b, then multiple user planes can be utilized, e.g., one user plane for each user. A user plane is a figurative grouping of an ELCD, e.g., ELCD 112, and traffic channel planes, e.g., 113-1 through 113-M, along with their respective multipath demodulator planes, e.g. 111-1 through 111-N. The value of N and M is arbitrary and can span a wide range of values.

Similarly, only a single TCD, e.g., TCD 114a, is utilized for multiple demodulator planes, e.g., planes 111-1 through 111-N, in a given traffic channel plane, e.g., 113-1. This configuration is chosen for the present embodiment to eliminate hardware repetition, thus saving power and silicon area. In particular, the traffic channel code will be the same for all multipaths within that traffic channel. Thus, only a single traffic channel demodulator 114a can be used to supply all the multipaths with the signal.

Components of Pilot-Assisted Configurable All-Digital Demodulator

FIGS. 2 through 6 illustrate the physical structure and architecture of the configurable components of the configurable all-digital coherent demodulator. The components are presented as individual demodulator blocks that link together to form the configurable all-digital demodulator. FIGS. 7A–7F are flowcharts of the processes associated with the components of the configurable all-digital coherent demodulator.

Figure 2:
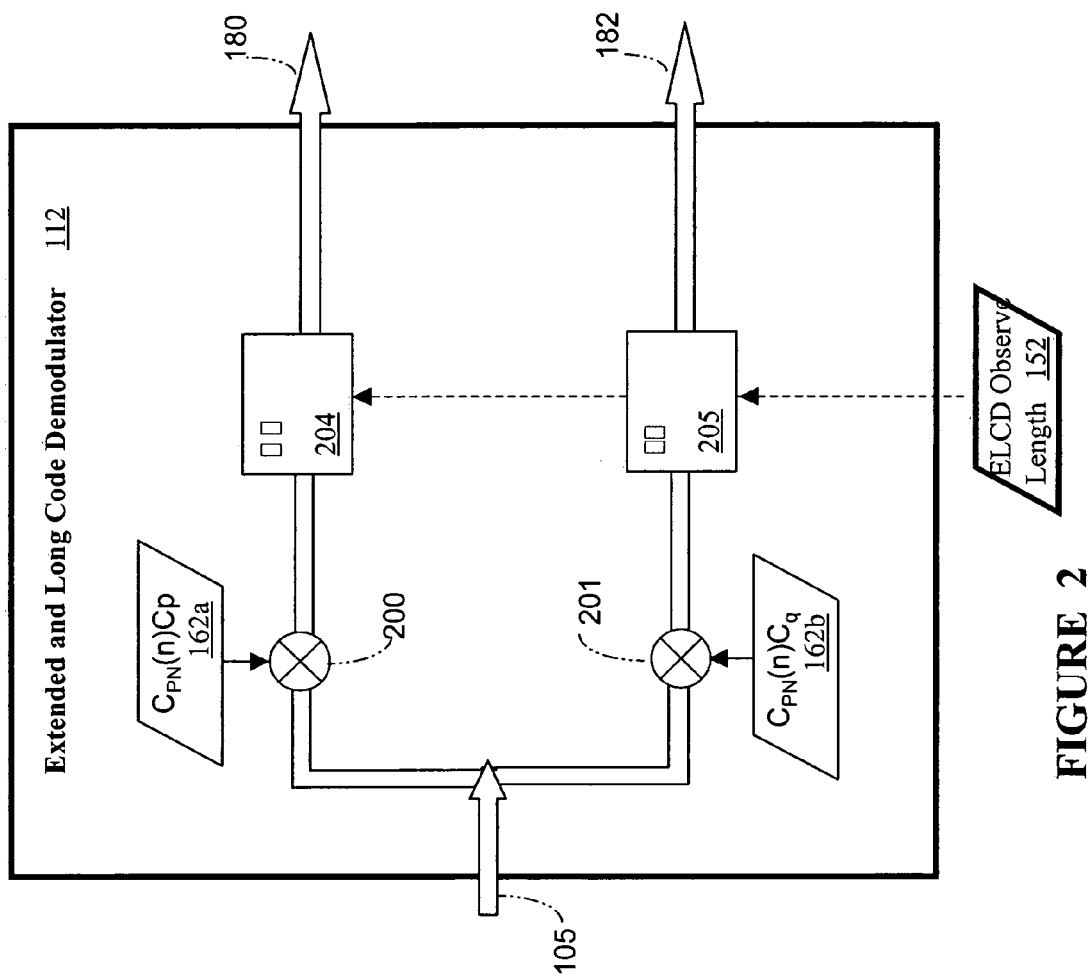
FIG. 2 is a block diagram of a configurable extended and long code demodulator (ELCD), in accordance with one embodiment of the present invention.

Referring now to FIG. 2, a block diagram of a configurable extended and long code demodulator (ELCD) is shown, in accordance with one embodiment of the present invention. ELCD 112 of FIG. 2 provides an exemplary extended and long code sequence demodulator for application in configurable demodulator kernels 174-1 and 174-2 of FIGS. 1C and 1D, respectively.

ELCD 112 essentially has two parallel branches, one for the in-phase portion of the signal, and one for the imaginary portion of the signal. In particular, ELCD 112 has a first multiply-logic device 200 and a second multiply-logic device 201, both of which are coupled to input 105. Multiply logic device 200 has an input to receive a code sequence 162a, $C_{PN}(n)C_p$, which is a product code of a unique long pseudonoise (PN) sequence, $C_{PN}(n)$ for user 'n' and an in-phase portion, $C_p$, of a complex extended PN sequence. Similarly, multiply-logic device 201 has an input to receive a code sequence 162b, $C_{PN}(n)C_q$, which is a product of the same unique long pseudonoise (PN) sequence and a quadrature-phase portion, $C_q$, of a complex extended PN sequence. In the present embodiment, ELCD 112 can demodulate any extended and long code sequence, given the appropriate configuration instructions, e.g., ELCD code configuration input 162 of FIG. 1A that specifies the ELCD code sequence input 162a and 162b.

Sum and dump, or accumulator, circuits 204 and 205, are coupled to multiply-logic devices 200 and 201, respectively. Both sum and dump circuits 204 and 205 have inputs to receive an observation length 152 that establishes the number of sum operations required before a dump operation is performed. Thus, sum and dump circuits 204 and 205 have a configurable accumulate, or integration, length. In this manner, the present invention allows ELCD 112 to be configured for a given user, application, and/or performance level. Sum and dump circuits 204 and 205 provide a real, e.g., in-phase, code demodulated sample on line 180 and a complex, e.g., quadrature-phase, code demodulated sample on line 182, respectively. Output lines 180 and 182 are coupled in parallel to TCD 114 and to PCPE 116, as shown in previous FIGS. 1C and 1D, and in subsequent FIGS. 3 and 4. First accumulator 204 and the second accumulator 205 each have separate add-logic devices for adding the in-phase portion and the quadrature-phase portion of a signal. Additional details of configurable-length accumulators are provided in FIG. 6.

Notably, ELCD 112 can include configurable sub components and cross-coupling that allow different combinations of multiplication operations to be performed between the in-phase and quadrature-phase channel signal on line 105 and the in-phase and quadrature-phase code sequence inputs 162a and 162b. This configurability provides the present invention with an even greater scope of accommodating multiple transmission despreading and demodulating techniques. One embodiment of such a configurable sub component is provided in the above-referenced co-pending U.S. patent application Ser. No. 09/751,785 entitled "A CONFIGURABLE MULTIMODE DESPREADER FOR SPREAD SPECTRUM APPLICATIONS".

Figure 3:
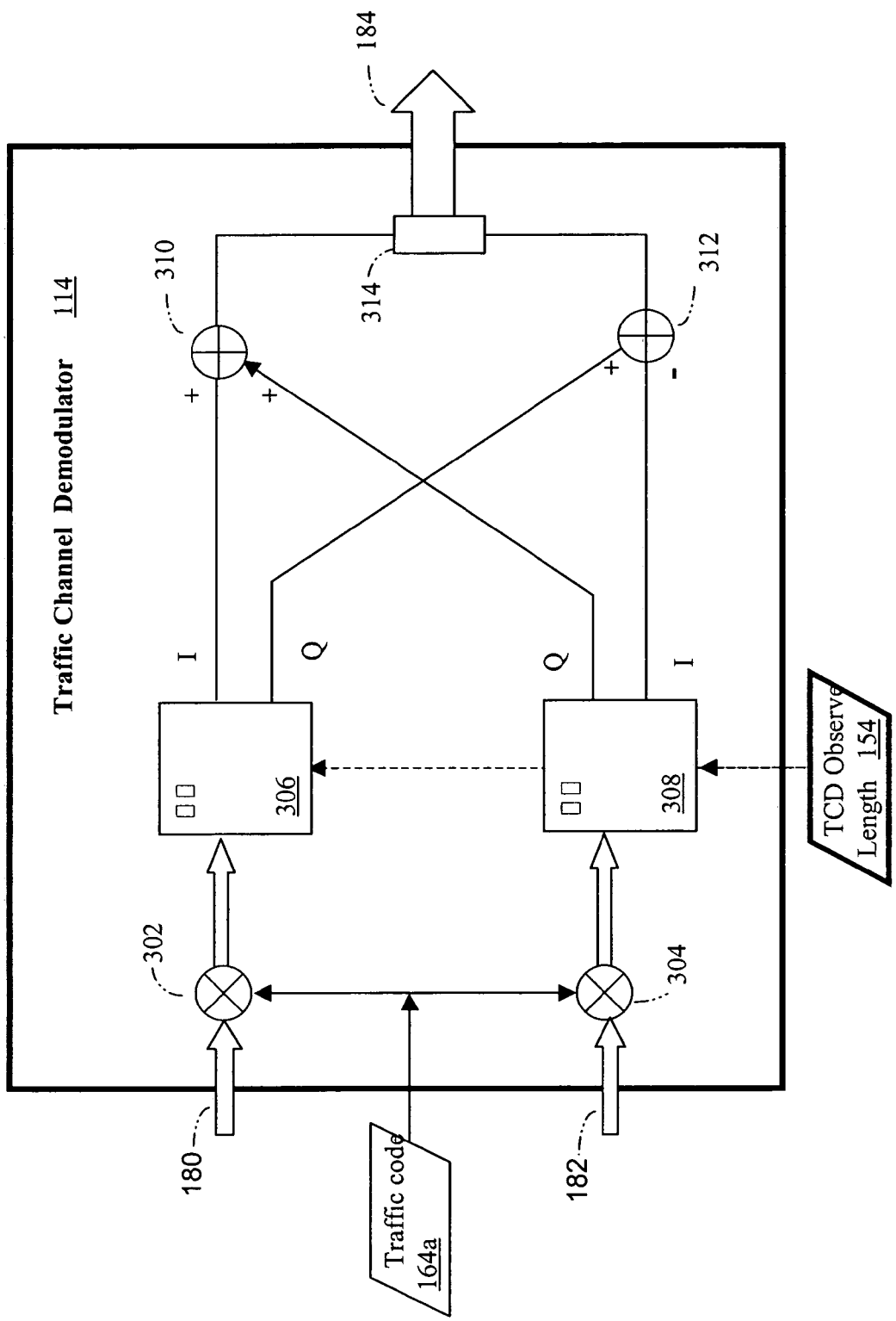
FIG. 3 is a block diagram of a configurable traffic channel demodulator (TCD), in accordance with one embodiment of the present invention.

Referring now to FIG. 3, a block diagram of a configurable traffic channel demodulator (TCD) is shown, in accordance with one embodiment of the present invention. TCD 114 of FIG. 3 provides an exemplary traffic channel demodulator for application in configurable demodulator kernels 174-1 and 174-2 of FIGS. 1C and 1D, respectively. TCD 114 receives code demodulated samples, on lines 180 and 182, from ELCD 112 and performs sample energy accumulation operations and multiple phase shift keying (MPSK) operations to produce a demodulated output data sample, on line 184, which has not been corrected for phase errors. The operation of TCD 114 is described in more detail in a subsequent flowchart.

TCD 114 essentially has two parallel branches, one for operations to obtain a real sample, and one for operations to obtain a quadrature-phase sample. In particular, TCD 114 includes a first multiply-logic device 302 on one branch that is coupled to input line 180, whose source is ELCD 112 of FIG. 2. Similarly, TCD 114 includes a second multiply-logic device 304 on another branch that is coupled to input line 182, whose source is ELCD 112 of FIG. 2. Both multiply logic devices 302 and 304 have inputs to receive a traffic code sequence 164a. TCD 114 can demodulate any traffic channel code sequence, given the appropriate configuration instructions, e.g. TCD code configuration input 164 of FIG. 1 that specifies the TCD code sequence input 164a. In the present embodiment, traffic code sequence input 164a is a $W_d$ that is based on a short Walsh code. However, traffic code sequence input 164a can be based on another code sequence in another embodiment.

A first sum and dump, or accumulator, circuit 306 is coupled to multiply-logic device 302, while a second sum and dump, or accumulator, circuit 308 is coupled to multiply-logic device 304. Both sum and dump circuits 306 and 308 have inputs to receive an observation length 154 that establishes the number of sum operations required before a dump operation is performed on an in-phase portion and a quadrature-phase portion of the sum. Thus, sum and dump circuits 306 and 308 have a configurable accumulate, or integration, length. In this manner, the present invention allows TCD 114 to be configured for a given user, application, and/or performance level. First accumulator 306 and the second accumulator 308 each have separate add-logic devices for adding the in-phase portion and the quadrature-phase-phase portion of a signal. Additional details of configurable-length accumulators are provided in FIG. 6.

TCD 114 also includes a first adder-logic device 310 coupled to an output for an in-phase signal from first sum and dump circuit 306 and coupled to an output for a quadrature-phase signal from second sum and dump circuit 308. In a complementary manner, TCD 114 includes a second adder-logic device 312 coupled to an output for a quadrature-phase signal from first sum and dump circuit 306 and coupled to an output for a real signal from second sum and dump circuit 308. Outputs from first adder-logic device 310 and second adder-logic device 312 are coupled to an interface 314 that provides a demodulated output data sample on line 184 to a subsequent block. Interface 314 can include a memory buffer and circuitry for serial transmission of the in-phase and quadrature-phase portions of signals received from first adder-logic device 310 and from second adder-logic device 312. Alternatively, interface 314 can be a bus of parallel lines, one for the in-phase portion of the signal and one for the quadrature-phase portion of the signal. This configuration applies to other interfaces in configurable demodulator 110-1.

Figure 4:
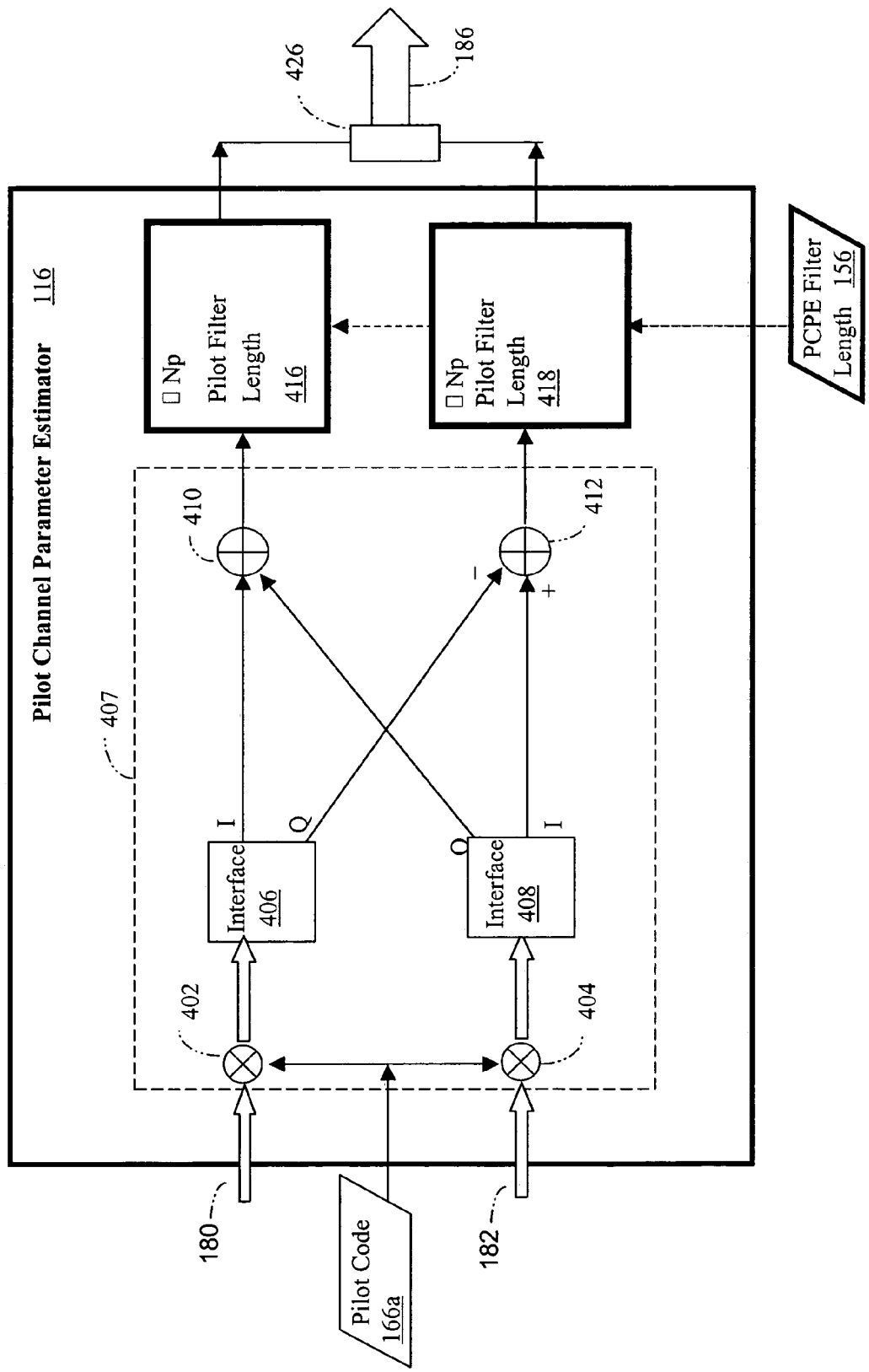
FIG. 4 is a block diagram of a configurable pilot channel parameter estimator (PCPE), in accordance with one embodiment of the present invention.

Referring now to FIG. 4, a block diagram of a configurable pilot channel parameter estimator (PCPE) 116 is shown, in accordance with one embodiment of the present invention. PCPE 116 provides an exemplary pilot channel parameter estimator for application in configurable demodulator kernels 174-1 and 174-2 of FIGS. 1C and 1D, respectively. PCPE 116 receives code demodulated samples, on lines 180 and 182, from ELCD 112 and performs an open-loop phase estimation in an open-loop channel estimator 407, followed by a filtering operation in filters 416 and 418 to produce a phase correction signal based on the pilot channel phase error, on line 186. The operation of PCPE 116 is described in more detail in a subsequent flowchart.

PCPE 116 essentially has two parallel branches in open-loop channel estimator 407 and with respect to filters 416 and 418, one for operations to obtain an in-phase sample, and one for operations to obtain a quadrature-phase sample. In particular, open loop channel estimator 407 includes a first multiply-logic device 402, e.g., on one branch, coupled to input line 180, whose source is ELCD 112 of FIG. 2. Similarly, PCPE 116 includes a second multiply-logic device 404, e.g., on another branch, coupled to input line 182, whose source is also ELCD 112 of FIG. 2. Both multiply logic devices 402 and 404 have inputs to receive a pilot channel code sequence 166*a*. PCPE 116 can demodulate any pilot channel code sequence, given the appropriate configuration instructions, e.g., PCPE code configuration input 166 of FIG. 1 that specifies the code sequence input 166*a*. In the present embodiment, pilot channel code sequence input 166*a*, $W_p$, is based on a short Walsh code. However, pilot channel code sequence input 166*a* can be based on another code in an alternative embodiment. Multiply-logic device 402 is coupled to a first interface circuit 406 to transfer a first pilot demodulated sequence, while multiply-logic device 404 is coupled to a second interface circuit 408 to transfer a second pilot demodulated sequence. Both interface circuits 406 and 408 provide separate in-phase (I) and quadrature-phase (Q) output lines of the complex signal that is input to them from multipliers 402 and 404, respectively.

PCPE 116 also includes a first adder-logic device 410 coupled to an output for an in-phase signal from first interface 406, and cross-coupled to an output for a quadrature-phase signal from second interface 408. In a complementary manner, PCPE 116 also includes a second adder-logic device 412 cross-coupled to an output for a quadrature-phase signal from first interface 406, and coupled to an output for an in-phase signal from second interface 408.

A first sum and dump, or filter, circuit 416 is coupled to first adder 410, while a second sum and dump, or filter, circuit 418 is coupled to second adder 412. Both first filter 416 and second filter 418 have an input for receiving a filter length 156 that establishes the number of sum operations required before a dump operation is performed. Thus, filters 416 and 418 have a configurable filter, or integration, length. In this manner, the present invention allows a parameter estimator, e.g., for a pilot signal, to be configured for a given user, application, and/or performance level. Filters 416 and 418 are configured for a finite impulse response (FIR) operation in the present embodiment, but can be configured for an infinite impulse response (IIR) operation in another embodiment. Both filter configurations are known by those skilled in the art. Additional details on a configurable-length accumulator, or filter, are provided in FIG. 6. First filter circuit 416 and second filter circuit 418 are coupled to an interface 426 that provides the in-phase and quadrature-phase portions of signals from filters 416 and 418 to subsequent block via line 186. Interface 426 has similar components and functions as interface 314 of FIG. 3.

Figure 5:
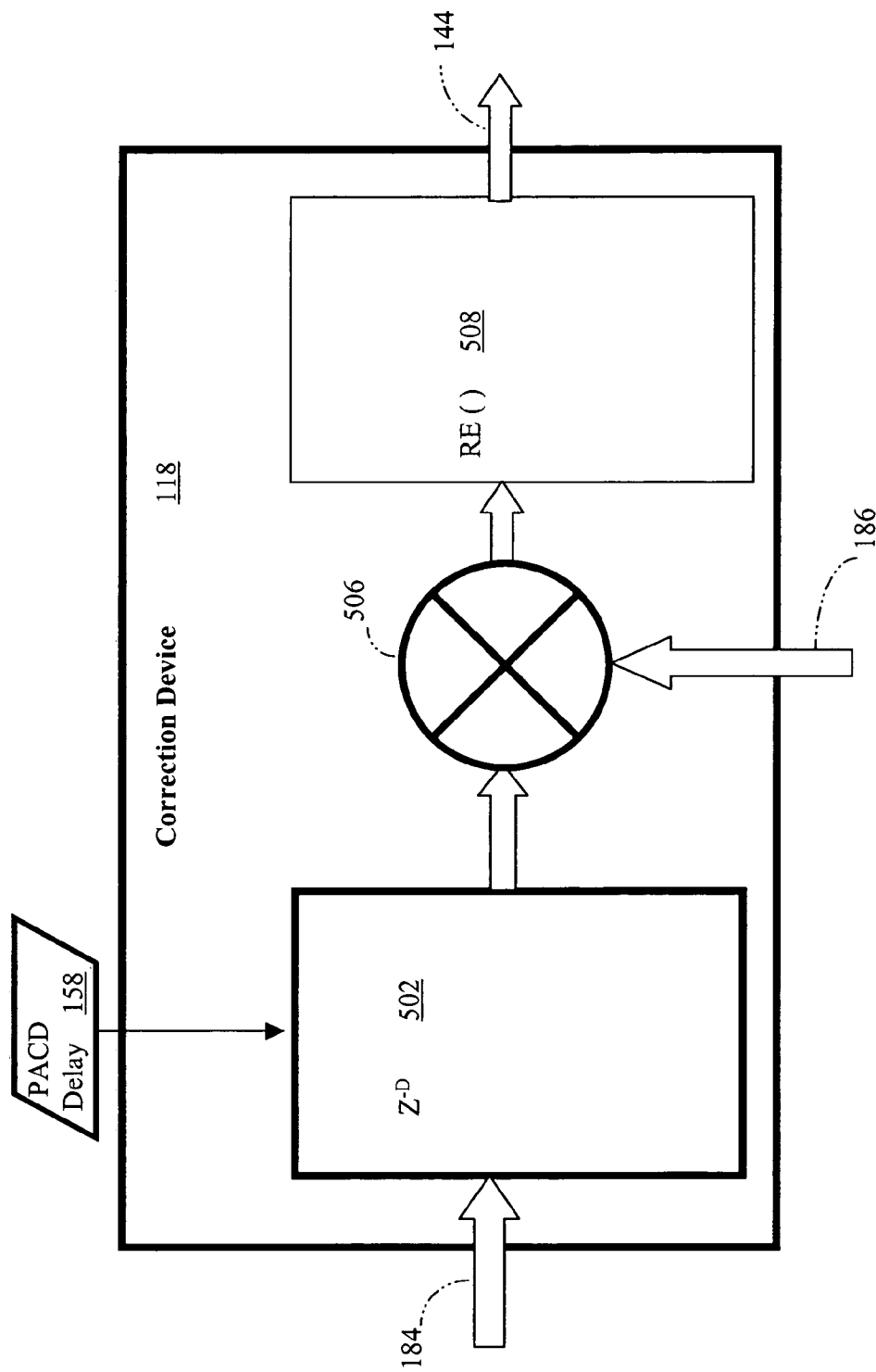
FIG. 5 is a block diagram of a configurable correction device used to correct the phase of a data channel, in accordance with one embodiment of the present invention.

Referring now to FIG. 5, a block diagram of a configurable pilot assisted correction device (PACD) 118 used to correct phase of a data channel is shown, in accordance with one embodiment of the present invention. Configurable PACD 118 provides an exemplary correction device for application in configurable demodulator kernels 174-1 and 174-2 of FIGS. 1C and 1D, respectively. PACD 118 implements the phase correction signal from PCPE 116 on demodulated output data sample from TCD 114. The operation of PCPE 116 is described in more detail in a subsequent flowchart.

PACD 118 includes a delay buffer, $Z^{-D}$ 502 coupled to a multiplier logic device 506. In turn, multiplier logic device 506 is coupled to an interface 508 via line 186 to feed forward a phase-corrected data signal. The power "-D" refers to the amount of delay, in cycles or time that is accommodated in delay buffer 502. Delay buffer 502 includes memory buffer hardware, e.g., a variable tap delay line, which can store data. An input to delay buffer 502 receives a delay value 158 that establishes the amount of delay, e.g., quantity of cycles, between receiving a sample on input line 184 and transmitting the sample to multiply-logic device 506. Thus, PACD 118 has a configurable filter, or integration, length. In this manner, the present invention allows a parameter estimator, e.g., for a pilot signal, to be configured for a given user, application, and/or performance level. Delay buffer 502 has an input 184 coupled to TCD 114 for receiving a demodulated output data sample. And multiplier has an input 186 coupled to PCPE 116 for receiving a feed forward phase error correction signal.

Real buffer 508 also includes memory buffer hardware for storing phase corrected in-phase and quadrature-phase data that is subsequently communicated to processing block 119 of FIG. 1A for subsequent operations, e.g., decoding. Buffer 508 has an output line 144 coupled to data processing block 119, as shown in FIG. 1C for providing the real signal for subsequent operations. In this manner, real or m-ary phase data can be provided and interpreted by subsequent data processing block 119.

Figure 6:
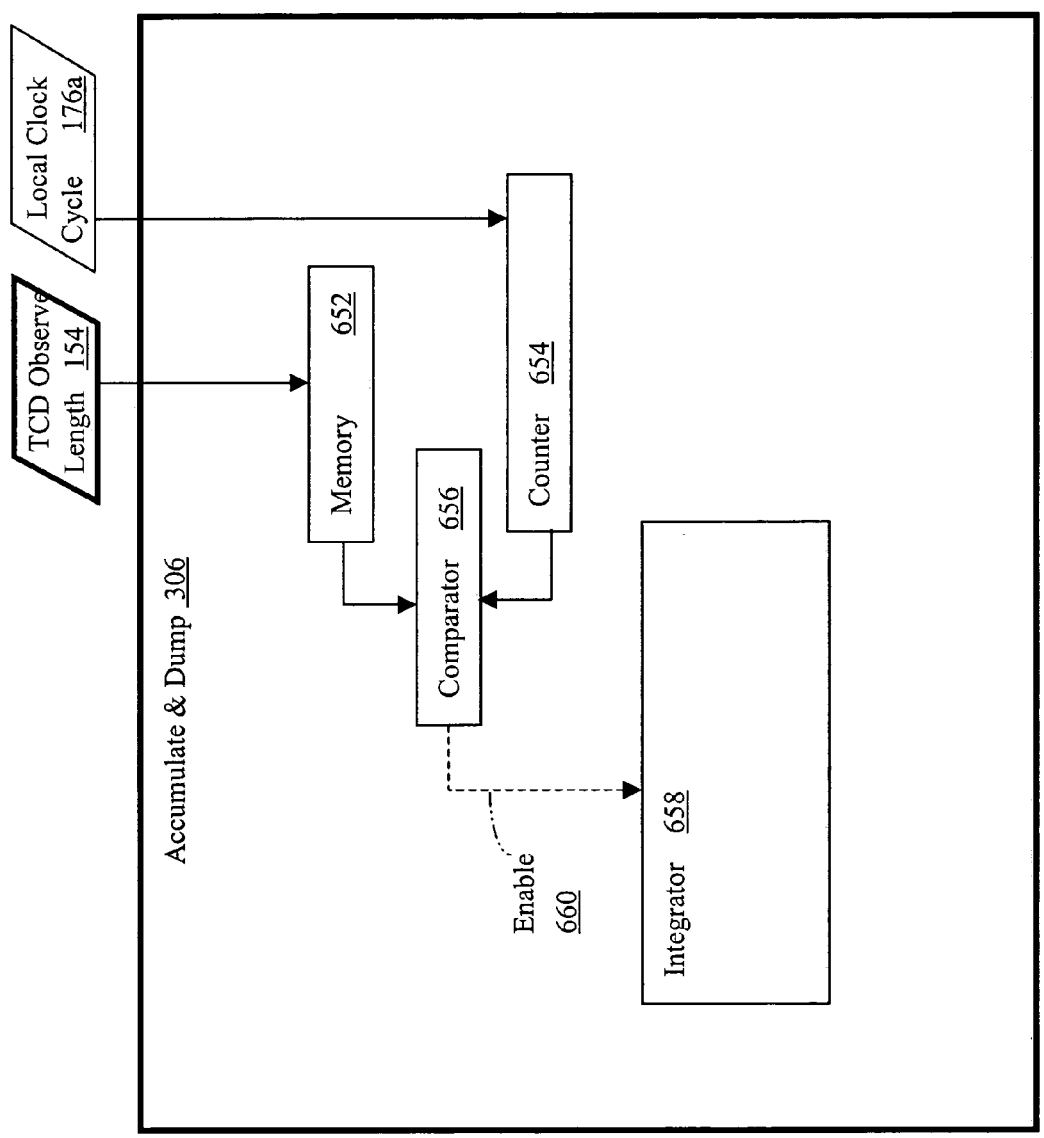
FIG. 6 is a block diagram of a configurable accumulate and dump circuit used in a demodulator, in accordance with one embodiment of the present invention.

Referring now to FIG. 6, a block diagram of a configurable accumulate and dump circuit used in a demodulator is shown, in accordance with one embodiment of the present invention. FIG. 6 provides an exemplary configurable accumulate and dump circuit 306 for TCD 114 of FIG. 3. However, the components in configurable accumulate (or sum) and dump circuit 306 that provide the comparison and enable logic are equally applicable to: 1) configurable accumulator circuits 204 and 205 for ELCD 112 of FIG. 2; 2) configurable filter circuits 416 and 418 for PCPE 118 of FIG. 4; and 3) configurable delay buffer 502 for PACD 118. The detailed operation of configurable accumulate and dump circuit 306 is described in more detail in a subsequent flowchart.

Configurable accumulate and dump circuit 306 includes a comparator 656, a counter 654, and a dump length block 652. Dump length block 652, e.g., a memory register, has an input line for receiving a configurable observation length 154. Counter 654 is a device known to those skilled in the art for counting clock cycles. Counter 654 has an input line for receiving a local clock cycle input 176*a*, e.g., as provided by clock line 176 from local controller 172 of FIG. 1B. Comparator 656 is coupled to both counter 654 and dump length block 652 for purposes of comparing the clock cycle count in counter 654 with the dump length value stored in memory register 652 and providing an enabling signal on enable line 660. Enable line is coupled to an integrator circuit 658 to enable a change in state, e.g., a dump and reset operation.

While configurable accumulate and dump circuit 306 of FIG. 6 provides specific hardware for functions such as counter and comparator, the present invention is well suited to using alternative hardware such as a local base band controller. Furthermore, while configurable accumulate and dump circuit 306 of FIG. 6 provides a separate dump length block 652, comparator 656, and counter 654 for a single integrator circuit 658, the present invention is well suited to having multiple integrator circuits coupled to comparator. For example, integrator circuit 658 of configurable dump circuit 306 and integrator circuit (not shown) of configurable dump circuit 308 can both be coupled to comparator 656 for purposes of receiving an enable signal for a dump and reset operation. Because the two branches of TCD 114 operate in parallel on the same clock cycle in the present embodiment, they would both be controlled by the single enable signal.

FIGS. 3–6 utilize multiply, add, accumulate, interface, buffer, and filter circuits, that are multi-bit wide devices in the present embodiment, e.g., for performing multiply, operations on multi-bit entities, e.g., a bit word of any length. However, they can also be single bit width devices in another embodiment. Furthermore, the results provided from accumulate operations can be varying levels of bit groupings, ranging from chips to symbols or a portion thereof, to a data frame or a portion thereof, to a slot or portion thereof, and to a field or a portion thereof. Thus, after each accumulate and dump operation, the resultant sequence or sample can be labeled to one of these groupings. Multiply and add logic devices of FIGS. 3–5, e.g., 302, 402, and 506, respectively, handle operations on the in-phase and quadrature-phase portion of a signal using two-input AND gates for performing two-bit math operations in the present embodiment. However, multiply logic devices 302 and 304 can be implemented using a different gate device, e.g., an X-OR gate for a multiply operation on a multiple-bit sample.

Processes for Configurable All-Digital Coherent Demodulation

Figure 7A:
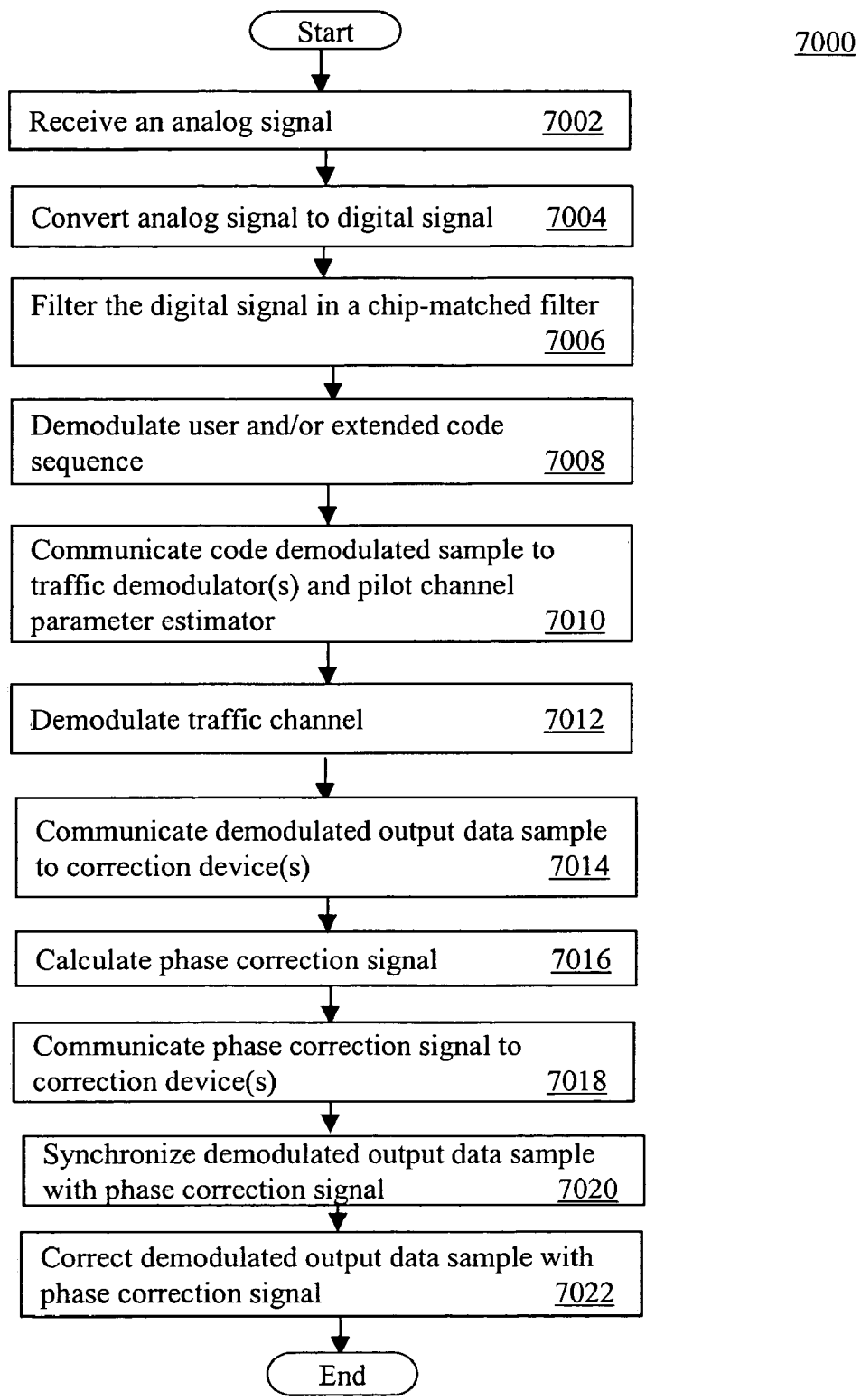
FIG. 7A is a flowchart of a process to demodulate a signal using an all-digital coherent demodulation with a feed forward correction signal, in accordance with one embodiment of the present invention.

The following detailed description for FIG. 7A provides a flowchart embodiment of the processes associated with the communication device embodiments of FIGS. 1A through 1D. The detailed description for FIGS. 7B through 7F provides flowchart embodiments of the processes associated with components of the configurable all-digital coherent demodulator. Flowcharts 7000 through 7500 are implemented using the exemplary hardware diagrams of FIG. 1A through FIG. 6. While FIGS. 7A through 7F accommodate complex signals, e.g., having an in-phase and a quadrature-phase component, the present invention is well suited to using only real signals, e.g., utilizing the in-phase portion and neglecting the unused quadrature-phase component. Furthermore, the present invention is well suited to using any one of multiple forms of complex signals, e.g., BPSK, MPSK, QAM, etc. The reference to samples as output from different demodulator blocks, e.g., ELCD, TCD, depends upon the utilization of a given block and depends upon the configurable accumulation lengths utilized. These variables will determine for a given configuration input, whether the samples from each demodulator block are classified as a symbol, a field, a slot, and a frame.

Referring now to FIG. 7A, a flowchart of a process to demodulate a signal using an all-digital coherent demodulation with a feed forward correction signal is shown, in accordance with one embodiment of the present invention. Flowchart 7000 can effectively be used to demodulate input data by using a wide range of demodulation schemes. Furthermore, flowchart 7000 can effectively be programmed to implement a wide range of future proprietary algorithms by virtue of the configurable functions and parameters. Flowchart 7000 is implemented primarily in communication device 100*a* of FIG. 1A, with more detailed descriptions of the process provided in subsequent flowcharts and implemented in component FIGS. 2–6.

Flowchart 7000 begins with step 7002. In step 7002 of the present embodiment, an analog signal is received. Step 7002 is implemented, in one embodiment using antenna 101 and radio frequency (RF) intermediate frequency (RF/IF) transceiver 102 of FIG. 1A. Antenna 101 and RF/IF transceiver 102 receive a wireless analog signal and perform signal mixing, filtering and gain control functions, respectively, as known to those skilled in the art. Following step 7002, flowchart 7000 proceeds to step 7004.

In step 7004 of the present embodiment, an analog signal is converted to a digital signal. Step 7002 is implemented, in one embodiment, by A/D converter 104. In particular, A/D converter 104 digitizes the analog signal from the RF transceiver 102 into a digital signal in a reception path. Following step 7004, flowchart 7000 proceeds to step 7006.

In step 7006 of the present embodiment, a digital signal is filtered in a chip-matched filter. Step 7002 is implemented, in one embodiment, chip matched filter (CMF) 108 matches the signal to a chip pulse shape suitable for subsequent processing in base band processing block 106 of FIG. 1A. The output of CMF 108 can be a complex signal, which is represented by the wide interconnect 105. Following step 7006, flowchart 7000 proceeds to step 7008.

In step 7008 of the present embodiment, a user and/or extended code sequence is demodulated. Step 7008 is implemented, in one embodiment, using a quantity and placement of extended and long-code demodulator (ELCD) 112 as shown in FIGS. 1C and 1D. Likewise, one embodiment of the composition of ELCD 112 is provided in FIG. 2. While the present embodiment utilizes a product of user and extended code, another embodiment can only utilize a user code. Step 7008 is described in more detail, in one embodiment, in subsequent flowchart 7100 of FIG. 7B. Following step 7008, flowchart 7000 proceeds to step 7010.

In step 7010 of the present embodiment, a code-demodulated sample is communicated to traffic demodulator(s) (TCD) and to a pilot channel parameter estimator (PCPE). Step 7010 is implemented, in one embodiment by communicating a first codede-modulated sample, e.g., an in-phase portion of the code demodulated sample, via line 180 to both TCD 114 and PCPE 116 for further processing. Similarly, a second code demodulated sample, e.g., a complex portion of the code demodulated sample, is communicated via line 182 to both TCD 114 and PCPE 116 for further processing. Following step 7010, flowchart 7000 proceeds to step 7012.

In step 7012 of the present embodiment, a traffic channel is demodulated. Step 7012 is implemented, in one embodiment, using traffic channel demodulator (TCD) 114 coupled in communication device as shown in FIGS. 1C and 1D. FIG. 1D provides for the communication protocol where a single user has multiple traffic channels, thus requiring a single user demodulation step/device with subsequent multiple traffic channel demodulation steps/devices. Likewise, one embodiment of the composition of TCD 114 is provided in FIG. 2. While the present embodiment utilizes a product of user and extended code for demodulating the traffic code, another embodiment can utilize only a user code. Step 7012 is described in more detail, in one embodiment, in subsequent flowchart 7200 of FIG. 7C. Following step 7012, flowchart 7000 proceeds to step 7014.

In step 7014 of the present embodiment, a demodulated output data sample is communicated to a correction device. Step 7014 is implemented, in one embodiment, by communicating a real and/or complex portion of the demodulated output data sample, via line 184 to PACD 118 for further processing. Following step 7014, flowchart 7000 proceeds to step 7016

In step 7016 of the present embodiment, a phase correction signal is calculated. Step 7016 is implemented, in one embodiment, using pilot channel parameter estimator (PCPE) 116, that is coupled in communication device as shown in FIGS. 1C and 1D. In particular, a single PCPE 116 is provided for each multipath signal configured in a communication device. In this manner, the present invention provides a capability for discretely correcting phase error of a multipath signal, based solely on the phase error of the pilot channel in that multipath signal. FIG. 4 provides one embodiment of the composition of PCPE 116. Step 7012 is described in more detail, in one embodiment, in subsequent flowchart 7300 of FIG. 7C and in flowchart 7400 of FIG. 7D. Following step 7016, flowchart 7000 proceeds to step 7018

In step 7018 of the present embodiment, a phase correction signal is communicated to correction device(s). Step 7018 is implemented, in one embodiment by communicating the phase correction signal, as determined by PCPE 116 in step 7016, via line 186 to pilot assisted correction device (PACD) 118 for further processing. Notably, the phase correction signal is communicated in a forward direction. In this manner, the present invention corrects the phase of a data signal in real time, provided the phase correction signal and the data signal for which it was calculated are synchronized. Thus, the present invention overcomes the limitation of a conventional feedback phase correction system wherein data signals are corrected for a past phase error, e.g., due to feedback timing. As a result, the fidelity of the data signal is much greater than that of a conventional feedback system. Following step 7018, flowchart 7000 proceeds to step 7020

In step 7020 of the present embodiment, a demodulated output data sample is synchronized with a phase correction signal. Step 7020 is implemented, in one embodiment, by delay buffer 502 of PACD 118 in FIG. 5. Step 7020 is described in more detail, in one embodiment, in subsequent flowchart 7500 of FIG. 7F. Following step 7020, flowchart 7000 proceeds to step 7022.

Lastly, in step 7022 of the present embodiment, demodulated output data samples are corrected with a phase correction signal. Step 7022 is implemented, in one embodiment by PACD 118 of FIG. 5. Step 7020 is described in more detail, in one embodiment, in subsequent flowchart 7500 of FIG. 7F. Following step 7022, flowchart 7000 ends.

Figure 7B:
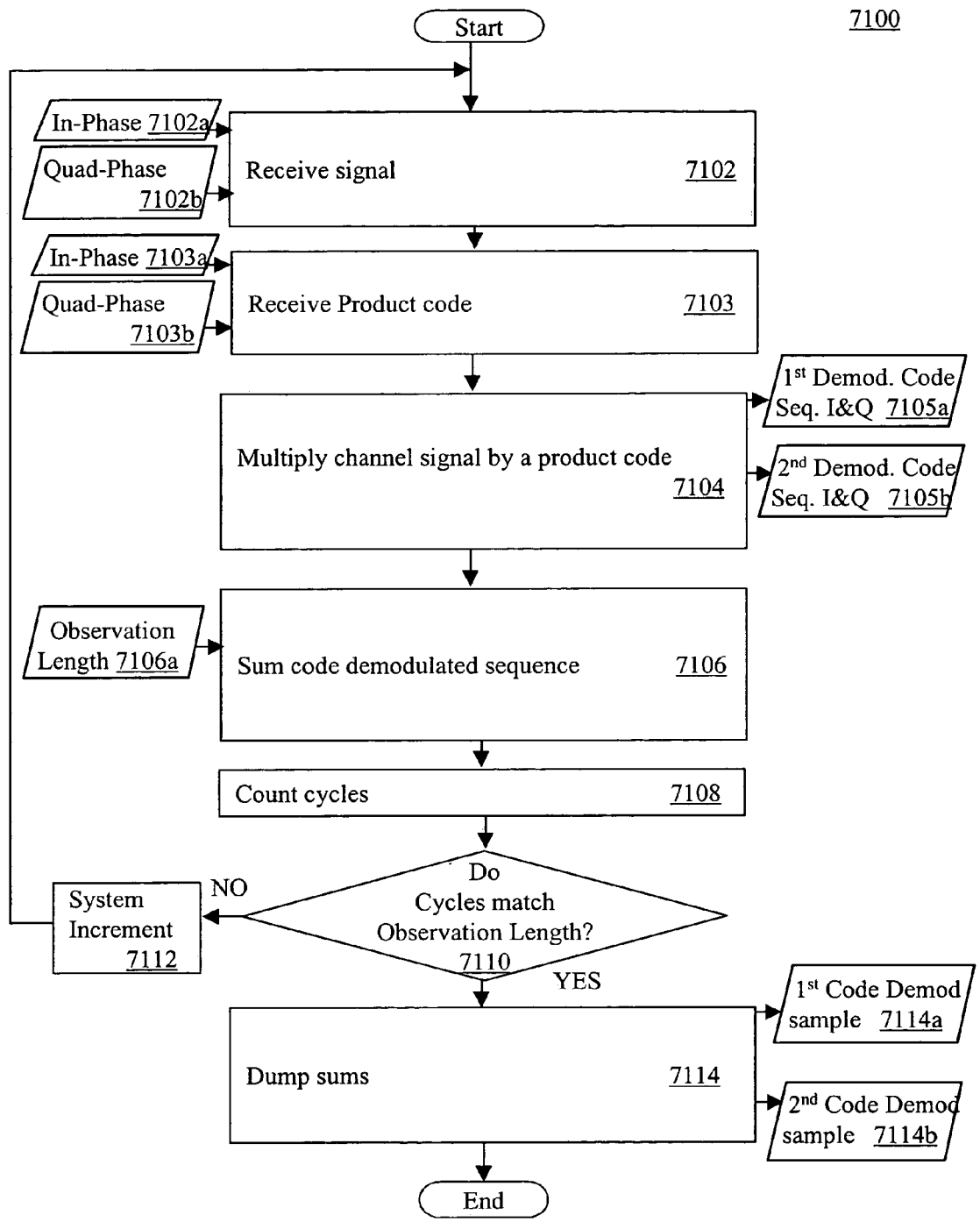
FIG. 7B is a flowchart of a process to demodulate an extended and long code from a received signal, in accordance with one embodiment of the present invention.

Referring now to FIG. 7B, a flowchart of a process to demodulate an extended and long code from a received signal is shown, in accordance with one embodiment of the present invention. Flowchart 7100 provides exemplary steps for implementing demodulation step 7008 of Flowchart 7000 in FIG. 7A. Flowchart 7100 is implemented primarily in ELCD 112 of FIG. 2. By providing a configurable demodulating code sequence and a configurable integration length, the present invention provides a process capable of demodulating a wide range of user and/or extended code modulation schemes. Consequently, flowchart 7100 provides steps that can effectively accommodate a wide range of existing and future proprietary or non-proprietary algorithms.

In step 7102 of the present embodiment, a signal is received for demodulation, e.g., in-phase and quadrature-phase signal inputs 7102a and 7102b respectively. Step 7102 is implemented, in one embodiment, by receiving a complex digital signal at ELCD 112 via line 105, from front-end processing block 103, as shown in FIG. 1A and FIG. 2.

Received signal, referred to as a complex channel signal or an encoded data signal, is communicated to two branches to provide the same complex digital signal at first multiplier 200 and second multiplier 201. The two branches reflect the parallel processing of complex digital signal to obtain a real sample and a complex sample. Following step 7102, flowchart 7100 proceeds to step 7103.

In step 7103 of the present embodiment, a product code is received as input 7103a for a real product code and 7103b for a complex product code. Step 7103 is implemented, in one embodiment, by receiving a first product code of $C_p \times C_{PNLong}$ 162a at multiplier-logic device 200 in the first branch, and by receiving a second product code $C_q \times C_{PNLong}$ 162b at multiplier-logic device 201 in the second branch. The configuration of product code inputs 162a and 162b of FIG. 2 is dictated by ELCD code configuration input 162 to communication device 100a in FIG. 1, which in turn is provided by an outside source such as a wireless service provider. Each of these product codes are in fact the product of the extended code and long codes used at the transmitter. Product codes are provided by a code generator unit (CGU), e.g., CGU 140 of FIG. 1A. In another embodiment, an extended code sequence is not utilized in a transmission technique, and thus only a user code would be utilized in step 7103 for inputs 162a and 162b. In yet another embodiment, no user or extended code modulation is utilized in a transmission technique. In this embodiment, a product code inputs 162a and 162b are all ones (1) in order to effectively bypass extended and long code demodulation operations of flowchart 7100. In this manner, the present invention provides for modulation techniques for existing and future extended and user, or long code, channel modulation techniques. Following step 7103, flowchart 7100 proceeds to step 7104.

In step 7104 of the present embodiment, the complex channel signal is multiplied by a product code. Step 7104 is implemented in one embodiment by multiply-logic devices 200 and 201, which multiply the complex channel signal by the respective first and second product codes. The product that is output from multiply-logic devices 200 and 201 is referred to as a first and second code demodulated sequence, outputs 7105a and 7105b, respectively, each of which have in-phase and/or quadrature phase components. The multiply operation is performed on multiple bit samples in the present embodiment, though it is also performed on single-bit samples in another embodiment. Notably, ELCD 112 can include configurable sub components that allow different combinations of multiplication operations for step 7104 to be performed between the real and complex channel signal on line 105 and the real and complex code sequence inputs 162a and 162b. This configurabiltiy provides the present invention with an even greater scope of accommodating multiple transmission despreading and demodulating techniques. Following step 7104, flowchart 7100 proceeds to step 7106.

In step 7106 of the present embodiment, the code-demodulated sequence is summed. Step 7106 is implemented, in one embodiment, by configurable accumulate and dump circuits 204 and 205. More specifically, configurable accumulate and dump circuit 204 of the first branch accumulates the code demodulated sequence provided by multiply-logic device 200 from step 7104. Similarly, configurable accumulate and dump circuit 205 in the second branch accumulates the code demodulated sequence provided by multiply-logic device 201 from step 7104. First configurable accumulate and dump circuit 204 produces a first code-demodulated sample, while second configurable accumulate and dump circuit 204 produces a second code-demodulated sample.

Step 7106 receives an integration length input 7106a that provides the desired quantity of accumulate operations to occur before a dump operation occurs. Input 7106a is implemented in the present embodiment by ELCD 112 observation length input 152 to communication device 100a of FIG. 1A, and subsequent forwarding to configurable accumulate and dump circuits 204 and 205 of FIG. 2. In one embodiment, a quantity of accumulate operations may be, for example 10 chips per sample, as defined by a given transmission technique used for extended and/or long code modulation. In this embodiment, integration length input 7106a would be a value of 10 cycles or interactions over which an accumulation, or integration operation, would occur. In another embodiment, an extended code sequence is not utilized in a transmission technique, and thus only a user code would be utilized in step 7106 for inputs 152. In yet another embodiment, no user or extended code modulation is utilized in a transmission technique. In this latter embodiment, an observation length input 7106a is unity, e.g., 1, thus passing each chip through ELCD 112 without integrating them together. This latter embodiment effectively bypasses extended and long code demodulation operations of flowchart 7100. In this manner, the present invention provides for existing and future modulation techniques in extended and user, or long code, channel modulation techniques. This configurabiltiy allows the receiver, e.g., communication device 100a to demodulate different modulation and spreading techniques utilized at a transmitter. Consequently, the present invention is capable of being configured to demodulate a wide variety of communication techniques. Following step 7106, flowchart 7100 proceeds to step 7108.

In step 7108 of the present embodiment, cycles are counted. Step 7108 is implemented, in one embodiment by a counter device, e.g., 654, as applied to a configurable accumulate and dump circuit, e.g., circuit 204. Step 7108 counts local clock cycles applicable to ELCD 112. Following step 7108, flowchart 7100 proceeds to step 7110.

In step 7110 of the present embodiment, an inquiry determines whether the cycles counted match an observation length. If the cycles counted do match the observation length, then flowchart 7100 proceeds to step 7112. However, if cycles counted do not match the observation length, then flowchart proceeds to step 7114. Step 7110 is implemented, in one embodiment, by a single comparator, e.g., 656, as applied to both configurable accumulate and dump circuits 204 and 205. In an alternative embodiment, each sum and dump circuit 204 and 205 has a comparator. Step 7110 provides the logic to determine when the desired observation length has been satiated.

Step 7112 arises if the cycles counted do not match an observation length, per step 7110. In step 7112 of the present embodiment, the system increments. Step 7112 is implemented, in one embodiment, by a local clock cycling as an input 665 to counter 654 as shown in FIG. 6. Following step 7112, flowchart 7100 returns to step 7102.

Step 7114 arises if the cycles counted match an observation length, per step 7110. In step 7114 of the present embodiment, the sums are dumped. Step 7114 is implemented, in one embodiment, by comparator, e.g., 656, providing an enable signal that dumps an accumulated sum in integrator, e.g., integrator 658, of configurable integrate and dump device 306, as shown in FIG. 6. Thus, a first and second code demodulated sample output 7114a and 7114b is produced. An intrinsic part of step 7114 is to reset counter 654 for step 7108 for flowchart 7100 to repeat ab initio. Following step 7114, flowchart 7100 ends.

Figure 7C:
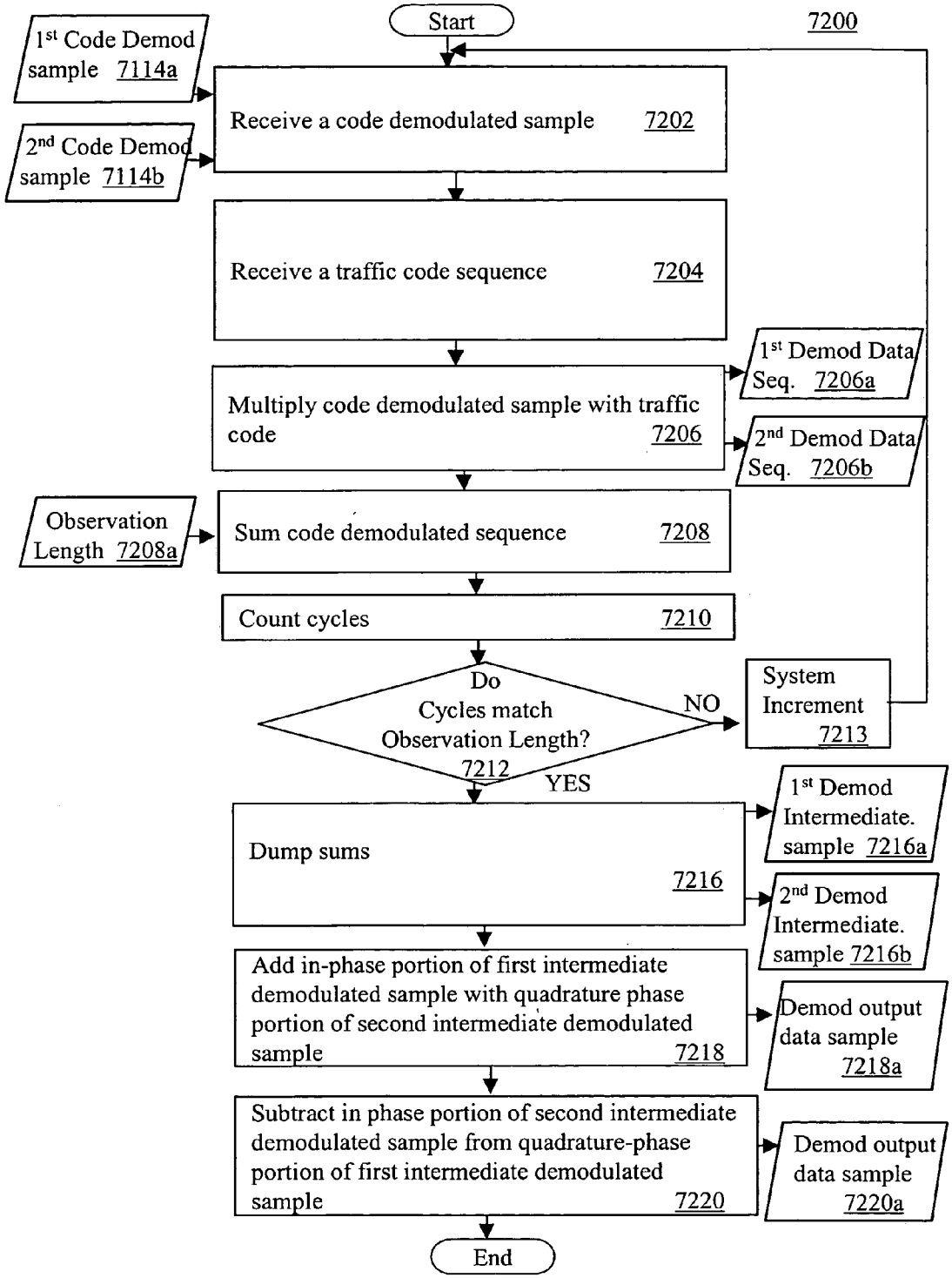
FIG. 7C is a flowchart of a process to demodulate a traffic channel code from a received signal, in accordance with one embodiment of the present invention.

Referring now to FIG. 7C, a flowchart of a process to demodulate a traffic channel code from a received signal is shown, in accordance with one embodiment of the present invention. Flowchart 7200 provides exemplary steps for implementing demodulation step 7012 of Flowchart 7000 in FIG. 7A. Flowchart 7200 is implemented primarily in TCD 114 of FIG. 3. By providing a configurable traffic channel code sequence and a configurable integration length, the present invention provides a process capable of demodulating a wide range of transmission modulation schemes. The variety of transmission modulation schemes also accounts for backwards compatibility to transmission techniques that do not use traffic channel encoding. Consequently, flowchart 7200 provides steps that can effectively accommodate a wide range of existing and future proprietary and non-proprietary algorithms.

In step 7202 of the present embodiment, a code-demodulated sample is received. Step 7202 is implemented, in one embodiment, by receiving a first code demodulated sample 7114a and a second code demodulated sample 7114b. These samples are transmitted from ELCD 112 on input lines 180 and 182 to traffic channel demodulator (TCD) 114 of FIG. 3, in the present embodiment. The code-demodulated samples can each have only in-phase components or in-phase and quadrature components. Following step 7202, flowchart 7200 proceeds to step 7204.

In step 7204 of the present embodiment, a traffic code sequence is received. Step 7204 is implemented, in one embodiment, by receiving the same traffic channel code sequence 164a at both multipliers 302 and 304. In the present embodiment, traffic channel code sequence is a short Walsh code $W_d(n)$. However, the present invention is well suited to using any traffic code as dictated by TCD code configuration input 164 provided to communication device 100a, e.g., per a user's specification. Code sequence input 164a is provided by a CGU, e.g., CGU 140, in the present embodiment. In one embodiment, no traffic channel code is utilized in a transmission technique. In this embodiment, a traffic channel code of all ones (1) can be provided to effectively bypass traffic channel demodulation. In this manner, the present invention provides for modulation techniques for existing and future traffic channel modulation techniques. And the present invention provides backwards compatibility for legacy protocols that do not use traffic channel modulation. Following step 7204, flowchart 7200 proceeds to step 7206.

In step 7206 of the present embodiment, a code-demodulated sample is multiplied with a traffic code sequence. Step 7206 is implemented similarly to step 7104 from flowchart 7100, but uses multiply-logic devices 302 and 304 of FIG. 3 to produce a first demodulated data sequence output 7206a and second demodulated data sequence 7206b, respectively. Following step 7206, flowchart 7200 proceeds to step 7208.

In step 7208 of the present embodiment, the code-demodulated sequence is summed. Step 7208 is similar to step 7106 from flowchart 7100, but is implemented in the present embodiment by configurable accumulate and dump circuits 306 and 308 to produce a first and a second intermediate demodulated data sample, respectively. Both the first and second intermediate demodulated data sample can have an in-phase component and a quadrature-phase component. Step 7208 receives an integration length input 7208a that provides the desired quantity of accumulate operations to occur before a dump operation occurs. Consequently, the present invention is capable of being configured to demodulate a wide variety of traffic channel modulation techniques. Following step 7208, flowchart 7200 proceeds to step 7210.

In step 7210 of the present embodiment, cycles are counted. Step 7210 is implemented similarly to 7108 of flowchart 7100, but uses a counter device, e.g., counter 654, as applied to configurable accumulate and dump circuits 306 and 308. Following step 7210, flowchart 7200 proceeds to step 7212.

In step 7212 of the present embodiment, an inquiry determines whether cycles match pilot filter length. If the cycles counted do match the observation length, then flowchart 7200 proceeds to step 7216. However, if cycles counted do not match the observation length, then flowchart proceeds to step 7213. Step 7212 is implemented similarly to 7110 of flowchart 7100, but uses a single comparator, e.g., comparator 656, as applied to both configurable accumulate and dump circuits 306 and 308.

In step 7216 of the present embodiment, the sums from the configurable accumulate and dump circuits are dumped. Step 7216 is similar to step 7114 of flowchart 7100, but is implemented in the present embodiment by a comparator, e.g., comparator 656, providing an enable signal to configurable accumulate and dump circuits 306 and 308. Step 7216 provides an in-phase and a quadrature-phase portion of a first intermediate demodulated sample 7216a, and an in-phase and a quadrature-phase portion of a second intermediate demodulated sample 7216b. Following step 7216, flowchart 7200 proceeds to step 7218.

In step 7218 of the present embodiment, an in-phase portion of the first intermediate demodulated sample is added to a quadrature phase portion of the second intermediate demodulated sample. Step 7218 is implemented similarly to 7106 of flowchart 7100, but uses first adder-logic circuit 310 for receiving and adding the in-phase portion of the first intermediate demodulated sample to the quadrature-phase portion of the second intermediate demodulated sample. Thus, step 7218 produces a demodulated output data sample 7218a. Following step 7218, flowchart 7200 proceeds to step 7220.

In step 7220 of the present embodiment, an in-phase portion of a second intermediate demodulated sample is subtracted from a quadrature-phase portion of a first intermediate demodulated sample. Step 7218 is implemented similarly to 7218, but subtracts the in-phase portion of the second intermediate demodulated sample from the quadrature-phase portion of the first intermediate demodulated sample, using second adder-logic circuit 312. Thus, step 7220 produces a demodulated output data sample 7220a, which, along with demodulated output data sample 7218a, is managed by interface 314 and provided on output line 184 to subsequent demodulator components. The operation performed by steps 7218 and 7220 can be referred to as an inner-product operation. Following step 7218, flowchart 7200 proceeds to step 7220.

Figure 7D:
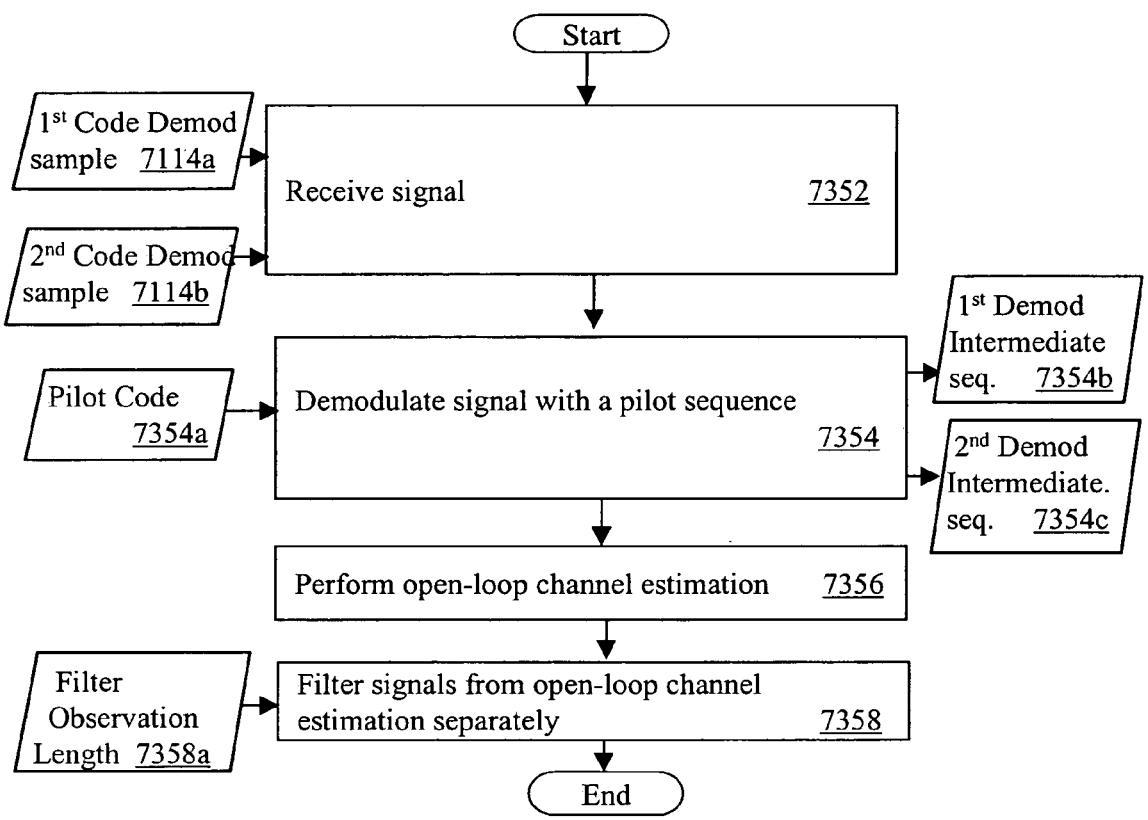
FIG. 7D is a flowchart of a process to estimate parameters of a pilot channel, in accordance with one embodiment of the present invention.

Referring now to FIG. 7D, a flowchart of a process to estimate parameters of a pilot channel is shown, in accordance with one embodiment of the present invention. Flowchart 7300 provides exemplary steps for implementing phase correction step 7016 of Flowchart 7000 in FIG. 7A. Flowchart 7300 is implemented primarily in PCPE 116 of FIG. 4. By providing a process by which the phase of the pilot signal can be estimated, the present invention provides a source of error correction signal for configurable demodulator 110-1 of FIG. 1A.

PCPE 116 takes the outputs of ELCD 112, and performs open-loop phase estimation. The unmodulated pilot signal is tracked in an open loop channel estimator 402–406 followed by FIR filters 408, 410, integrating over an interval $N_p$, called the pilot filter length. It can be shown that the acquisition and tracking performance of the system is strongly dependent on $N_p$ and the pilot-channel energy, and this architecture realizes a quasi-coherent detector. This approach is superior to a closed loop phase tracking process, which suffers from the well-known weakness of cycle slipping, especially in fading channels. The performance of this approach in highly mobile environments is dependent on the amount of energy devoted to the pilot channel.

In step 7352 of the present embodiment, a signal is received. Step 7352 is implemented similarly to 7202 of flowchart 7200, but implemented by receiving the first code demodulated sample 7114a and the second code demodulated sample 7114b at PCPE 116, as shown in FIG. 4. Following step 7352, flowchart 7300 proceeds to step 7354.

In step 7354 of the present embodiment, the received signal is demodulated with a pilot sequence. Step 7354 is implemented in one embodiment by PCPE 116 of FIG. 4. Step 7354 receives a pilot sequence input 7354a for the demodulation. Input 7354a is implemented by pilot code input 166a provided to multipliers 402 and 404 of FIG. 4. Step 7354 produces a first demodulated intermediate sample output 7354b and a second demodulated intermediate sample output 7354c. Output 7354b and 7354c is provided to interface 406 and 408 of FIG. 4. Additional detail for implementing step 7354 is provided in steps 7402 through 7404 of subsequent flowchart 7400 in FIG. 7E. Following step 7354, flowchart 7300 proceeds to step 7356.

In step 7356 of the present embodiment, open-loop channel estimation is performed. Step 7356 is implemented, in one embodiment, using PCPE 116 of FIG. 4. Step 7012 is described in more detail, in one embodiment, by steps 7406 through 7412 of subsequent flowchart 7400 of FIG. 7E. Following step 7356, flowchart 7300 proceeds to step 7358.

In step 7358 of the present embodiment, the signals from open-loop channel estimation are filtered separately. An input of filter observation length 7358a provides configurabiltiy to step 7358. Step 7358 is implemented, in one embodiment, by pilot filter blocks 416 and 418 of PCPE 116 in FIG. 4. Step 7012 is described in more detail, in one embodiment, by steps 7414 through 7418 of subsequent flowchart 7400 in FIG. 7E. Following step 7358, flowchart 7300 ends.

Figure 7E:
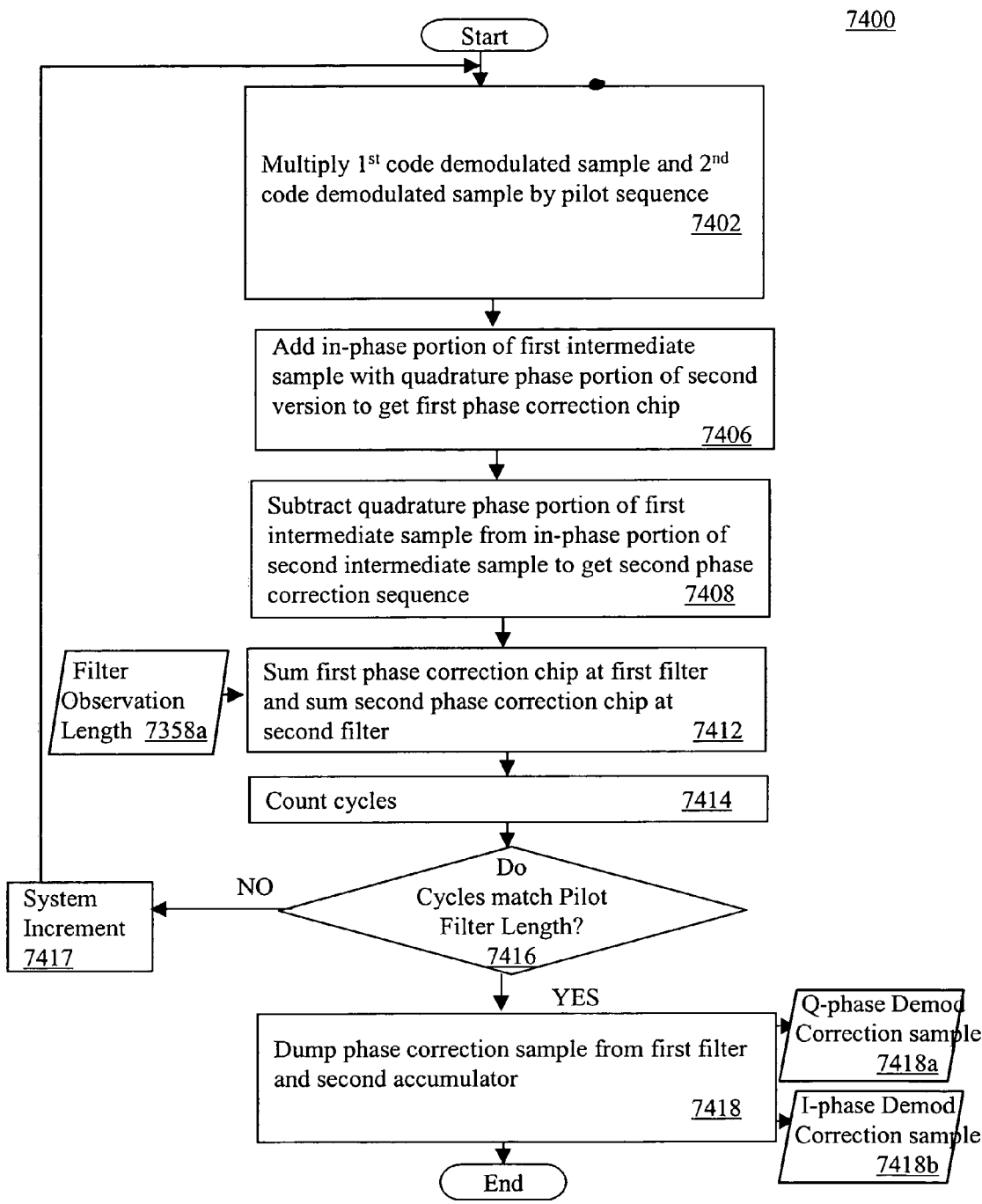
FIG. 7E is a flowchart of a more detailed process to estimate parameters of a pilot channel, in accordance with one embodiment of the present invention.

Referring now to FIG. 7E, a flowchart of a more detailed process to estimate parameters of a pilot channel is shown, in accordance with one embodiment of the present invention. Flowchart 7400 provides exemplary steps for implementing demodulation, open-loop channel estimation, and filtering steps 7354 through 7358 of flowchart 7300 in FIG. 7D.

In step 7402 of the present embodiment, a first code demodulated sample and a second code-demodulated sample are multiplied by a pilot sequence. Step 7402 is implemented in the present embodiment by multiplying the received first code demodulated sample 7114a and second code demodulated sample 7114b with an appropriate pilot code sequence, e.g., pilot sequence input 7354a as shown in step 7354. Pilot code sequence input 166a is provided to multiplier-logic devices 402 and 404 of PCPE 116, as dictated by configured input PCPE code configuration 166 of FIG. 1C and 1D. Interface blocks 406 and 408 provide the in-phase portion and the quadrature-phase portion, e.g., via buffering, of the pilot demodulated sequence that is output from both multipliers 402 and 404. Following step 7402, flowchart 7400 proceeds to step 7406.

In step 7406 of the present embodiment, an in-phase portion of first intermediate sample is added to a quadrature-phase portion of second version to produce a first phase correction sequence. Step 7406 is implemented similarly to 7218 of flowchart 7200, but performs an add operation at adder-logic device 410. Following step 7406, flowchart 7400 proceeds to step 7408.

In step 7408 of the present embodiment, a quadrature-phase portion of first intermediate sample is subtracted from in-phase portion of the second intermediate sample to get second phase correction sequence. Step 7408 is implemented similarly to step 7406, but uses adder-logic device 412 for the subtraction operation. Following step 7408, flowchart 7400 proceeds to step 7412.

In step 7412 of the present embodiment, the first phase correction sequence is summed at the first filter and the second phase correction sequence is summed at the second filter. An input of filter observation length 7358a is provided for step 7412 similar to that provided to step 7358 of flowchart 7400. Step 7412 is implemented, in one embodiment, by configurable filter circuits 416 and 418 of FIG. 4. More specifically, configurable filter circuit 416 accumulates the phase correction sequence provided by add-logic device 410 from step 7406. Similarly, second configurable filter circuit 418 accumulates the code demodulated sequence provided by multiply-logic device 201 from step 7104. First configurable filter 416 and second configurable filter 418 can also perform other filtering operations such as weighting by a preset or a variable factor, e.g., provided with input PCPE filter length 156 of FIG. 1A. Step 7412 receives a filter length input 7412a that dictates the desired quantity of accumulate operations to occur before a dump operation occurs, as dictated by PCPE filter length 156 provided to communication device 100a. This configurabiltiy allows the present invention to accommodate different transmission protocols used for the pilot sequence. Consequently, the present invention is capable of being configured to adjust phase error over a wide variety of communication protocols. Following step 7412, flowchart 7400 proceeds to step 7414.

In step 7414 of the present embodiment, cycles are counted. Step 7414 is implemented similarly to step 7210 of flowchart 7200, but implements counter device, e.g., 654, for configurable pilot circuits 416 and 418. Step 7414 counts clock cycles local to PCPE 116. Following step 7414, flowchart 7400 proceeds to step 7416.

In step 7416 of the present embodiment, an inquiry determines whether cycles match pilot filter length. Step 7416 is implemented similarly to step 7212 of flowchart 7200, but applies a single comparator, e.g., 656, to both configurable filter circuits 416 and 418. However, if the cycles counted do match the filter length for step 7416, then flowchart 7400 proceeds to step 7417. Alternatively, if the cycles counted do not match the observation length, then flowchart proceeds to step 7418.

In step 7417, the system is incremented. Step 7417 is implemented similarly to 7112 of flowchart 7100, but uses a single comparator for the present step, e.g., comparator 656, as applied to both configurable filter circuits 416 and 418. Following step 7417, flowchart 7400 returns to step 7402.

In step 7418 of the present embodiment, a phase correction sample from first filter and second accumulator are dumped. Step 7418 is implemented similarly to step 7216 of flowchart 7200. However the present embodiment uses a comparator, e.g. 656 to provide an enable signal on enable line of pilot filter circuits 416 and 418 to dump an in-phase portion of the phase correction sample and a quadrature-phase portion of the phase correction sample, respectively. Step 7418 results in an in-phase demodulated correction sample output 7418b and a quadrature-phase demodulated correction sample output 7418a. Step 7114 includes a sub step of resetting counter 654 such that flowchart 7100 can repeat ab initio. Following step 7418, flowchart 7400 ends.

Figure 7F:
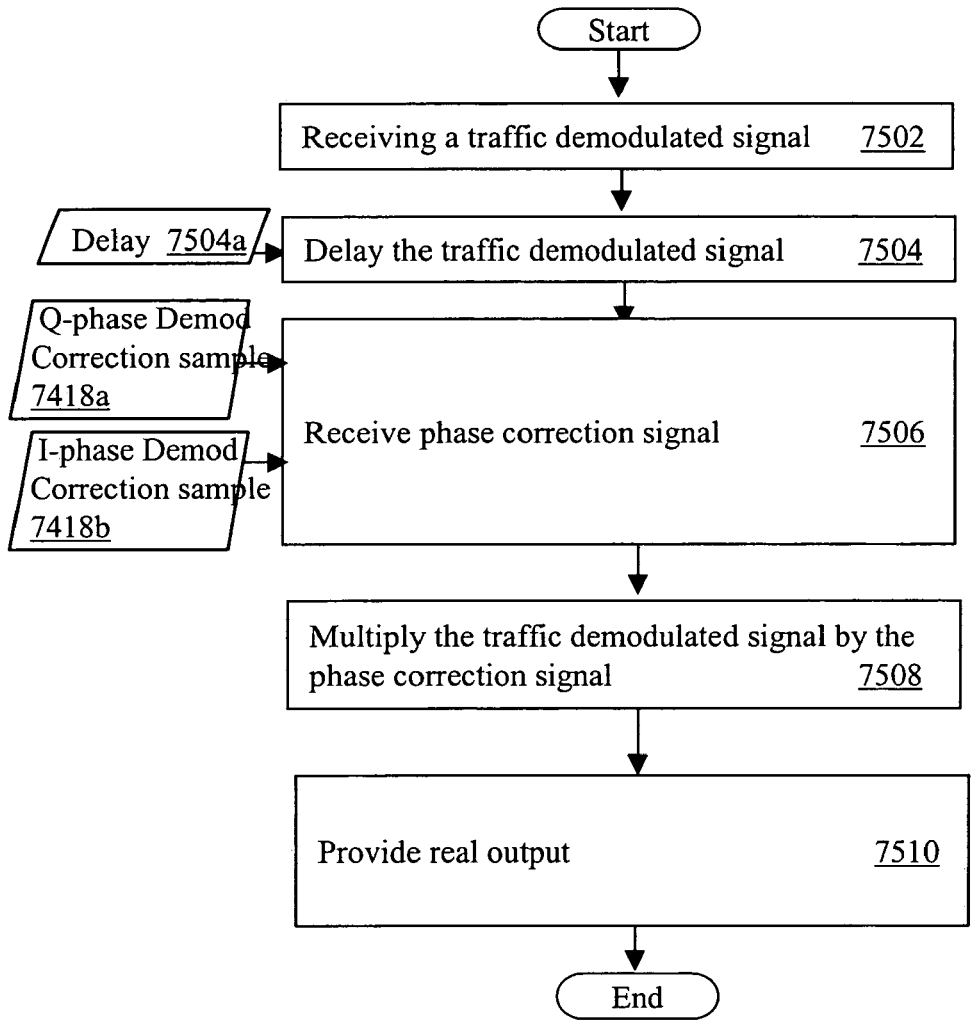
FIG. 7F is a flowchart of a process to correct phase error in a received signal via a feed forward phase correction signal, in accordance with one embodiment of the present invention.

Referring now to FIG. 7F, a flowchart of a process to correct phase error in a received signal via a feed forward phase correction signal is shown, in accordance with one embodiment of the present invention. Flowchart 7500 provides exemplary steps for implementing demodulation step 7020–8022 of flowchart 7000 in FIG. 7A. Flowchart 7500 is implemented primarily in PACD 118 of FIG. 5. By providing a process for correcting phase error of a data signal by using a feed forward error correction signal, the present invention provides a demodulator that corrects a given data value with its properly sequenced phase error, as determined by the pilot signal associated with that data value. Thus, the present invention provides significantly higher performance during the demodulation operation.

In step 7502 of the present embodiment, a traffic-demodulated signal is received. Step 7502 is implemented, in one embodiment, by communicating demodulated output data sample from TCD 114 to PACD 118 via line 184, as shown in FIGS. 1C, 1D, and 5. Following step 7502, flowchart 7500 proceeds to step 7504.

In step 7504 of the present embodiment, a traffic-demodulated signal is delayed. A delay value input 7504a is received in step 7504 to indicate the desired delay. Step 7504 is implemented in one embodiment by delay buffer 502, which receives a delay input 158 that dictates the desired number of samples or cycles to buffer, or hold, prior to passing them on to the next process. In particular, delay input is dictated by PACD delay 158 provided to communication device 100a, as shown in FIG. 1A. This configurabiltiy allows the present invention to accommodate different transmission techniques that have an effect on amount of time or cycles needed to perform the phase error estimation process. Consequently, the present invention is capable of being configured to adjust the delay over a wide variety of communication protocols, given the amount of memory buffer available in buffer block 502. In the present embodiment, the delay is equivalent to the total processing delay time incurred by PCPE 116. In this embodiment, the delay is sufficiently small so as not to adversely affect performance of the overall communication device. However, in another embodiment, delay 7504a is either greater or less than the total processing delay time incurred by PCPE 116, as determined by a given application or user specification, e.g., PACD delay input 158 of FIG. 1A. Following step 7504, flowchart 7500 proceeds to step 7506.

In step 7506 of the present embodiment, a phase correction signal is received. Inputs 7418a and 7418b are the quadrature-phase demodulated correction sample, and the in-phase demodulated correction sample, respectively, from step 7418 of flowchart 7400. Step 7506 is implemented, in one embodiment, by receiving phase correction sample from PCPE 116 at PACD 118 via line 186, as shown in FIGS. 1C, 1D, and FIG. 5. Received signal is a feed forward because it travels in the direction of the data signal processing operations. By delaying the demodulated output data sample, the phase correction signal has an opportunity to synchronize with the appropriate point of the data signal for which the phase error was determined. Thus, the present invention provides a very accurate and efficient method of correcting phase error in a data signal. Following step 7506, flowchart 7500 proceeds to step 7508.

In step 7508 of the present embodiment, a traffic-demodulated signal is multiplied by the phase correction signal is. Step 7508 is implemented similarly to step 7206 of flowchart 7200, but using multiply logic device 506. The product that is output from multiply-logic device 506 has been corrected for the measured phase error in the pilot channel. The phase correction is performed for the specific phase error in a given multipath signal, and thus overcomes the limitations of conventional phase error adjustment based on an average phase error over multiple multipath signals. Following step 7508, flowchart 7500 proceeds to step 7510.

In step 7510 of the present embodiment, a real output is provided. Step 7510 is implemented in the present embodiment by memory registers in real block 508 of FIG. 5. In this manner, the in-phase and quadrature-phase data values that have been corrected for error are available to subsequent processing blocks, e.g., block 119, in communication device 100*a*. These subsequent processing blocks can then interpret the phase-corrected in-phase portion and quadrature-phase portion of the data values, e.g., per an m-ary constellation. Following step 7510, flowchart 7500 ends.

While flowcharts 7000–8500 of the present embodiment show a specific sequence and quantity of steps, the present invention is suitable to alternative embodiments. For example, not all the steps provided in flowcharts 7000–8500 are required for the present invention. For example, flowchart 7000 provides steps 7012 for demodulating a traffic code channel. However, if a transmission technique does not utilize a traffic code channel, then step 7012 may be omitted, or neutralized, in one embodiment. Similarly, other steps may be omitted depending upon the application. In contrast, the present invention is well suited to incorporating additional steps to those presented, as required by an application, or as desired for permutations in the process.

Lastly, the sequence of the steps for flowcharts 7000–8500 can be modified depending upon the application. Thus, while flowcharts 7000–8500 are shown as a single serial process, they can also be implemented as a continuous or parallel process. For example, it is appreciated that flowcharts 7000–8500 can be repeated for the multiple hardware kernel planes, e.g., plane 110-1 through 110-N, of communication device 100*a* of FIG. 1A.

Many of the instructions for the steps, and the data input and output from the steps, of flowcharts 7000–8500 utilize memory and processor hardware components, e.g., memory 120, and processor 130, per FIG. 1A. The memory storage used to implement the flowchart steps in the present embodiment can either be permanent, such as read only memory (ROM), or temporary memory such as random access memory (RAM). Memory storage can also be any other type of memory storage, capable of containing program instructions such as flash memory. Similarly a processor used to implement the flowchart steps can either be a dedicated controller, an existing system processor, e.g., processor 130 of FIG. 1A, a local processor, e.g., processor or controller 172 of FIG. 1D, or it can be a dedicated digital signal processing (DSP) processor, as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, samples, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "demodulating," "performing," "filtering," "receiving," "dumping," "multiplying," "providing," "adding," "subtracting," "delaying," "summing," "accumulating," "comparing," "converting," "processing," "feeding," "generating," "synchronizing," "transmitting," "correcting," "formatting," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments presented herein, the present invention effectively provides a method and apparatus that overcomes the limitations associated with the varied hardware, software, and methodology of demodulating digital signals in each of the varied spread spectrum applications. Furthermore, the embodiments provided herein illustrate how the present invention corrects the phase error in a received signal. Lastly, the present embodiments illustrate how the present invention overcomes the limitations in conventional analog phase correction system. In particular, the embodiments explain how the present invention overcomes some of the major limitations of a conventional feedback system.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, the thereby enable others skilled in the art to best utilize the invention and various embodiments with various modifications as are suited to the particular use contemplated. It is intended that the scope of the invention be defined by the following claims and their equivalents.

I claim:

1. A configurable receiver for a CDMA system, the receiver comprising:
    an RF/IF stage for receiving an analog signal;
    an analog-to-digital (A/D) converter for converting the analog signal to a digital signal;
    a chip-matched filter for filtering the digital signal; and
    a plurality of configurable digital coherent demodulator systems, which are arranged in parallel to one another, for feed forward phase correcting and processing multipath components of the filtered digital signal.

2. A configurable receiver for a CDMA system, the receiver comprising:
    an RF/IF stage for receiving an analog signal;
    an analog-to-digital (A/D) converter for converting the analog signal to a digital signal;
    a chip-matched filter for filtering the digital signal; and
    at least one configurable digital coherent demodulator system for feed forward phase correcting the filtered digital signal,
    wherein the at least one configurable digital coherent demodulator system comprises a configurable pilot channel parameter estimator for processing a signal based on the filtered digital signal and having an input for receiving a configurable accumulator length to allow the parameter estimator to be configured for a given user, application, and/or performance level.

3. A configurable receiver for a CDMA system, the receiver comprising:
    an RF/IF stage for receiving an analog signal;
    an analog-to-digital (A/D) converter for converting the analog signal to a digital signal;
    a chip-matched filter for filtering the digital signal; and
    at least one configurable digital coherent demodulator system for feed forward phase correcting the filtered digital signal,
    wherein the at least one configurable digital coherent demodulator system comprises a configurable correction device having an input for receiving a configurable delay value which establishes an amount of delay between the configurable correction device receiving a sample of a demodulated signal, which is based on the filtered digital signal, and transmitting the sample.

4. A method of processing data using a configurable CDMA receiver, the method comprising the steps of:
    a) receiving an analog signal at an RE/IF stage;
    b) converting the analog signal to a digital signal using an analog-to-digital (A/D) converter;
    c) filtering the digital signal using a chip-matched filter to obtain a complex channel signal;
    d) processing the complex channel signal using a configurable demodulator system which performs feed forward phase correction;
    e) demodulating a user code sequence from the complex channel signal to produce code demodulated sample; and
    f) communicating the code demodulated sample to a plurality of configurable traffic demodulators.

5. The method recited in claim 4 further comprising the step of:
    g) demodulating a traffic code sequence from the code demodulated sample to produce a demodulated output data sample; and
    h) communicating the demodulated output data sample to a plurality of configurable pilot assisted correction devices for each of a plurality of multipath channels.

6. A method of processing data using a configurable CDMA receiver, the method comprising the steps of:
    a) receiving an analog signal at an RF/IF stage;
    b) convening the analog signal to a digital signal using an analog-to-digital (A/D) converter;
    c) filtering the digital signal using a chip-matched filter to obtain a complex channel signal;
    d) processing the complex channel signal using a configurable demodulator system which performs feed forward phase correction; and
    e) feeding forward a digital phase correction signal, which is based on the complex channel signal, within each of a plurality of configurable coherent demodulator systems to respectively correct a phase error in each of a plurality of a demodulated multipath data signals, which are based on the complex channel signal.

7. A method of processing data using a configurable CDMA receiver, the method comprising the steps of:
    a) receiving an analog signal at an RF/IF stage;
    b) converting the analog signal to a digital signal using an analog-to-digital (A/D) converter;
    c) filtering the digital signal using a chip-matched filter to obtain a complex channel signal; and
    d) processing the complex channel signal using a configurable demodulator system which performs feed forward phase correction, wherein step d) includes the following sub steps:
        d1) receiving a configurable pilot filter length at a configurable pilot channel estimator portion provided within the configurable demodulator system; and
        d2) generating a digital error correction signal, which is based on the complex channel signal, using an open loop phase estimator provided within the pilot channel estimator portion.

* * * * *

UNITED STATES PATENT AND TRADEMARK OFFICE
CERTIFICATE OF CORRECTION

| | | |
|---|---|---|
| PATENT NO. | : 7,010,061 B2 | Page 1 of 1 |
| APPLICATION NO. | : 09/751783 | |
| DATED | : March 7, 2006 | |
| INVENTOR(S) | : Ravi Subramanian | |

It is certified that error appears in the above-identified patent and that said Letters Patent is hereby corrected as shown below:

column 27, line 46, "RE/IF" should read --RF/IF--.

Signed and Sealed this

Twelfth Day of September, 2006

JON W. DUDAS
*Director of the United States Patent and Trademark Office*